US010268458B1

(12) United States Patent
Dolph et al.

(10) Patent No.: US 10,268,458 B1
(45) Date of Patent: *Apr. 23, 2019

(54) PROSPECTIVE VOICE USER INTERFACE MODALITY IDENTIFICATION

(71) Applicant: International Business Machines Corporation, Armonk, NY (US)

(72) Inventors: Blaine H. Dolph, Western Springs, IL (US); David M. Lubensky, Brookfield, CT (US); Mal Pattiarachi, New York, NY (US); Marco Pistoia, Amawalk, NY (US); Nitendra Rajput, Gurgaon (IN); Justin Weisz, Stamford, CT (US)

(73) Assignee: International Business Mahcines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,158

(22) Filed: Oct. 23, 2017

(51) Int. Cl.
G06F 9/44 (2018.01)
G06F 8/34 (2018.01)
G06K 9/00 (2006.01)
G06F 3/0484 (2013.01)
G06F 3/0481 (2013.01)

(52) U.S. Cl.
CPC ............ *G06F 8/34* (2013.01); *G06F 3/04842* (2013.01); *G06K 9/00456* (2013.01); *G06F 3/04817* (2013.01)

(58) Field of Classification Search
CPC .................................. G06F 8/34; G06F 3/167
USPC .......................................................... 717/113
See application file for complete search history.

(56) References Cited

U.S. PATENT DOCUMENTS

| 7,036,080 | B1 * | 4/2006 | James ..................... G10L 15/26 704/275 |
| 7,962,344 | B2 * | 6/2011 | Sharpe .................... G06F 3/167 379/88.28 |
| 8,352,908 | B2 | 1/2013 | Jhoney et al. |
| 9,026,443 | B2 | 5/2015 | Lenke |
| 9,081,550 | B2 * | 7/2015 | Oz .......................... G06F 3/167 |
| 9,107,083 | B1 | 8/2015 | Ledet |
| 9,240,183 | B2 | 1/2016 | Sharifi et al. |
| 9,418,661 | B2 | 8/2016 | Fay et al. |
| 9,601,116 | B2 | 3/2017 | Casado et al. |
| 9,679,562 | B2 | 6/2017 | Burke et al. |

(Continued)

OTHER PUBLICATIONS

Bernhard Suhm, "Towards Best Practices for Speech User Interface Design", 2003, pp. 2217-2220 (Year: 2003).*

(Continued)

*Primary Examiner* — Wei Y Zhen
*Assistant Examiner* — Lanny N Ung
(74) *Attorney, Agent, or Firm* — ZIP Group PLLC

(57) ABSTRACT

Techniques are disclosed for identifying which graphical user interface (GUI) screens of an application that is under development would benefit from a voice user interface (VUI). A GUI screen parser analyzes to determine the GUI objects within GUI screens of the application. The parser assigns a speechability score to each analyzed GUI screen. Those GUI screens that have a higher speechability score than a predetermined speechability threshold are indicated as GUI screens that would benefit (e.g., the user experience in interacting with those GUI screens would increase, the number of GUI screens displayed would be reduced, or the like) with the addition of a VUI.

20 Claims, 13 Drawing Sheets

(56) References Cited

U.S. PATENT DOCUMENTS

2006/0020917 A1   1/2006   Hying et al.
2007/0233495 A1*  10/2007  Agapi .......................... 704/270
2016/0336003 A1   11/2016  Agiomyrgiannakis et al.

OTHER PUBLICATIONS

Anonymously; "Hover-Over Content for User Interfaces"; http://ip.com/IPCOM/000236793D; May 15, 2014.

Anonymously; "Method and apparatus for a synchronous location sensitive text based IVR"; http://ip.com/IPCOM/000244811D; Jan. 18, 2016.

Schaffer, S. et al.; "Modeling input modality choice in mobile graphical and speech interface"; International Journal of Human-Computer Studies, pp. 21-34, 2015.

Perakakis, M. et al.; "A Study in Efficiency and Modality Usage in Multimodal Form Filling Systems"; Dept of Electronics & Computer Engineering, Technical Univ of Crete, Greece, email: prak©telecom.tuc.gr; 2008.

List of IBM Patents or Patent Applications Treated As Related, dated herewith.

Bernhard Suhm, "Towards Best Practices for Speech User Interface Design," 2003, pp. 2217-2220.

\* cited by examiner

PROSPECTIVE VOICE USER INTERFACE MODALITY IDENTIFICATION

BACKGROUND

Embodiments presented herein are related to electronic devices, and more specifically, to determining whether a speech user interface would be a constructive addition to a graphical user interface (GUI) of an application.

A GUI, is a type of user interface that allows users to interact with electronic devices through graphical icons, visual indicators, or the like, which are collectively referred to herein as GUI objects. Users may interact with the electronic device through direct manipulation of the GUI objects displayed in the GUI. Beyond computers, GUIs are used in many handheld mobile devices such as smartphones, MP3 players, portable media players, gaming devices, tablets, and smaller household, office and industrial devices.

A voice user interface (VUI) makes user interaction with the electronic device possible by using voice/speech. In general, the more complex the user's speech interactions, the more challenging it is for the VUI to recognize those speech interactions. On the other hand, a VUI may be beneficial for handling quick and routine user interactions with the electronic device.

Some electronic devices, such as mobile electronic devices, are ripe for speech based interfaces due to the typically small display size. In such devices, challenges exist both in providing input (e.g. via small virtual keyboards) and output (e.g. must tap/swipe/pinch to scroll through content). Additionally, speech can provide a hands-free mechanism to interact with the GUI of an application which can be useful for the user. Thus, it may be beneficial to determine whether the user's efficiency and/or experience of interacting with the GUI would be increased by adding a VUI.

SUMMARY

In an embodiment of the present invention, a method is presented. The method includes receiving application data of an application that is under development with a speechability service computing system from an application developer computing system and determining an application class of the application from the application data. The method further includes aggregating static images of a graphical user interface of the application (GUI screens) that are contained within the application data and analyzing each GUI screen to determine a quantity of text GUI objects within each GUI screen, a quantity of image GUI objects within each GUI screen, a quantity of audio GUI objects within each GUI screen, and a quantity of video GUI objects within each GUI screen. The method further includes assigning a speechability score to each GUI screen based upon the quantity of text GUI objects within each GUI screen, the quantity of image GUI objects within each GUI screen, the quantity of audio GUI objects within each GUI screen, and the quantity of video GUI objects within each GUI screen. The method further includes generating a list of GUI screens ranked by the speechability score of each GUI screen and identifying a speechability threshold that is associated with the application class. The method further includes creating an output data structure comprising the ranked list of GUI screens and a positive indication of first GUI screens that have a speechability score above the speechability threshold to designate the first GUI screens benefit from a voice user interface (VUI) and sending the output data structure with the application developer computing system.

In another embodiment of the present invention, a computer program product is presented. The computer program product includes a computer readable storage medium having program instructions embodied therewith. The program instructions are readable by a speechability service computing system to cause the speechability service computing system to receive application data of an application that is under development from an application developer computing system and determine an application class of the application from the application data. The program instructions are readable are further readable to cause the speechability service computing system to aggregate static images of a graphical user interface of the application (GUI screens) that are contained within the application data and analyze each GUI screen to determine a quantity of text GUI objects within each GUI screen, a quantity of image GUI objects within each GUI screen, a quantity of audio GUI objects within each GUI screen, and a quantity of video GUI objects within each GUI screen. The program instructions are readable are further readable to cause the speechability service computing system to assign a speechability score to each GUI screen based upon the quantity of text GUI objects within each GUI screen, the quantity of image GUI objects within each GUI screen, the quantity of audio GUI objects within each GUI screen, and the quantity of video GUI objects within each GUI screen. The program instructions are readable are further readable to cause the speechability service computing system to generate a list of GUI screens ranked by the speechability score of each GUI screen and identify a speechability threshold that is associated with the application class. The program instructions are readable are further readable to cause the speechability service computing system to create an output data structure comprising the ranked list of GUI screens and a positive indication of first GUI screens that have a speechability score above the speechability threshold to designate the first GUI screens benefit from a voice user interface (VUI) and send the output data structure with the application developer computing system.

In another embodiment of the present invention, a speechability service computing system is presented. The speechability service computing system includes a processor and a memory communicatively coupled to the processor. The memory is encoded with instructions that, when executed by the processor, cause the processor to receive application data of an application that is under development from an application developer computing system and determine an application class of the application from the application data. The instructions further cause the processor to aggregate static images of a graphical user interface of the application (GUI screens) that are contained within the application data and analyze each GUI screen to determine a quantity of text GUI objects within each GUI screen, a quantity of image GUI objects within each GUI screen, a quantity of audio GUI objects within each GUI screen, and a quantity of video GUI objects within each GUI screen. The instructions further cause the processor to assign a speechability score to each GUI screen based upon the quantity of text GUI objects within each GUI screen, the quantity of image GUI objects within each GUI screen, the quantity of audio GUI objects within each GUI screen, and the quantity of video GUI objects within each GUI screen. The instructions further cause the processor to generate a list of GUI screens ranked by the speechability score of each GUI screen and identify a speechability threshold that is associated with the application class. The instructions further cause the processor to create an output data structure comprising the ranked list of GUI screens and a positive indication of first GUI screens that have a speechability score above the speechability threshold to designate the first GUI screens benefit from a voice user interface (VUI) and send the output data structure with the application developer computing system.

DETAILED DESCRIPTION

Embodiments presented herein disclose techniques for determining whether the efficiency and/or experience of a user of a GUI would be increased with a VUI. Such techniques determine which GUI objects or GUI screens of an application should be speech enabled based on factors including, but not limited to, the density of information contained in each GUI screen, the type of GUI objects within the GUI, or the like. These techniques may be implemented during the design of the application using high-fidelity GUI mockups, during the build time of the application using GUI storyboard assets, and/or at run time of the application using application GUI screenshots and/or by tracing in-memory activity of the application. The techniques are utilized to generate one or more speechability scores for each GUI screen which is based on the presence of particular GUI objects. A series of speechability scores may be utilized by the application developer computing system to determine which GUI screens or GUI objects ought to be enabled with speech.

Figure 1:
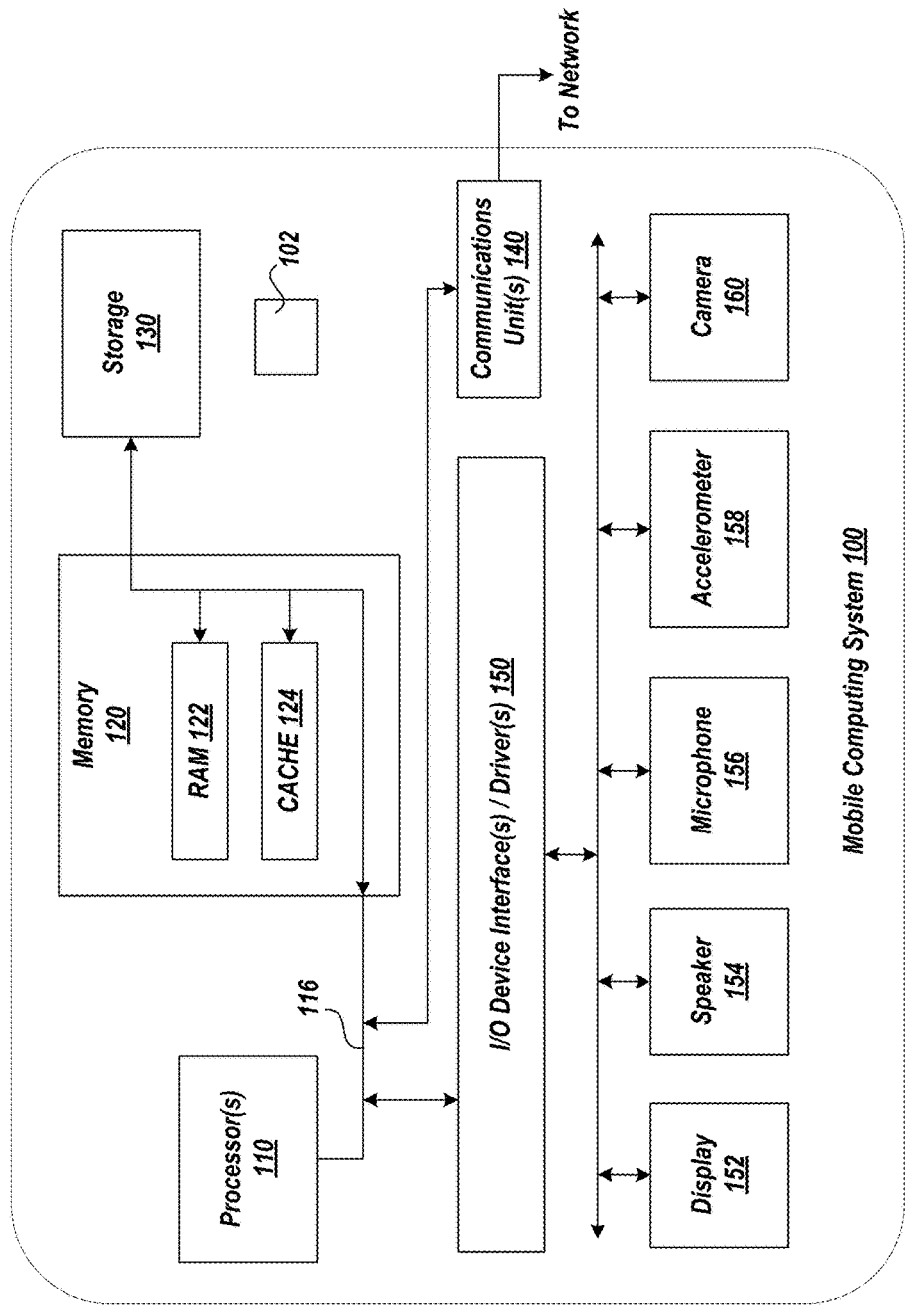
FIG. 1 illustrates an exemplary mobile computing system, according to one or more embodiments.

FIG. 1 illustrates an exemplary mobile computing system 100. Many modifications to the depicted features of the exemplary mobile computing system 100 may be made within the scope of the invention.

Mobile computing system 100 is a handheld portable electronic device and includes a bus 116, which provides communications between at least processor(s) 110, memory 120, persistent storage 130, communications unit 140, and input/output (I/O) interface(s)/driver(s) 150. Memory 120 and persistent storage 130 are examples of a computer readable storage device. A storage device is any piece of hardware that is capable of storing information, such as, data, program code in functional form, and/or other suitable information on a temporary basis and/or permanent basis. Memory 120 may be, for example, one or more random access memories (RAM) 122, cache memory 124, or any other suitable non-volatile or volatile storage device.

An application 102 that includes a GUI that is visually presented by display 152 is stored in persistent storage 130 for execution by one or more of the respective processors 110 via memory 120. In the embodiment illustrated in FIG. 1, persistent storage 130 can include one or more of flash memory, magnetic disk storage device of an internal hard drive, a solid state drive, a semiconductor storage device, read-only memory (ROM), EPROM, or any other computer-readable storage device that is capable of storing program instructions or digital information.

The storage media used by persistent storage 130 may also be removable. For example, a removable hard drive may be used for persistent storage 130. Other examples include an optical or magnetic disk that is inserted into a drive for transfer onto another storage device that is also a part of persistent storage 130, or other removable storage devices such as a thumb drive or smart card.

Communications unit(s) 140 provides for communications with other data processing systems or devices. Communications unit(s) 140 may include one or more network interface cards and may provide communications through the use of either or both physical and wireless communications links. In other embodiments, mobile computing system 100 may be devoid of communications unit 410. Application 102 may be downloaded to persistent storage 130 through communications unit(s) 140.

I/O device interface(s)/driver(s) 150 allows for input and output of data with other components within mobile computing system 100. For example, I/O device interface(s)/driver(s) 150 may provide a connection to display 152, a speaker 154, microphone 156, accelerometer 158, camera 160, and/or some other suitable input/output device. Display 152 provides a mechanism, such as a screen, to display the GUI to a user and may be, for example, a touch screen, or the like.

Figure 2:
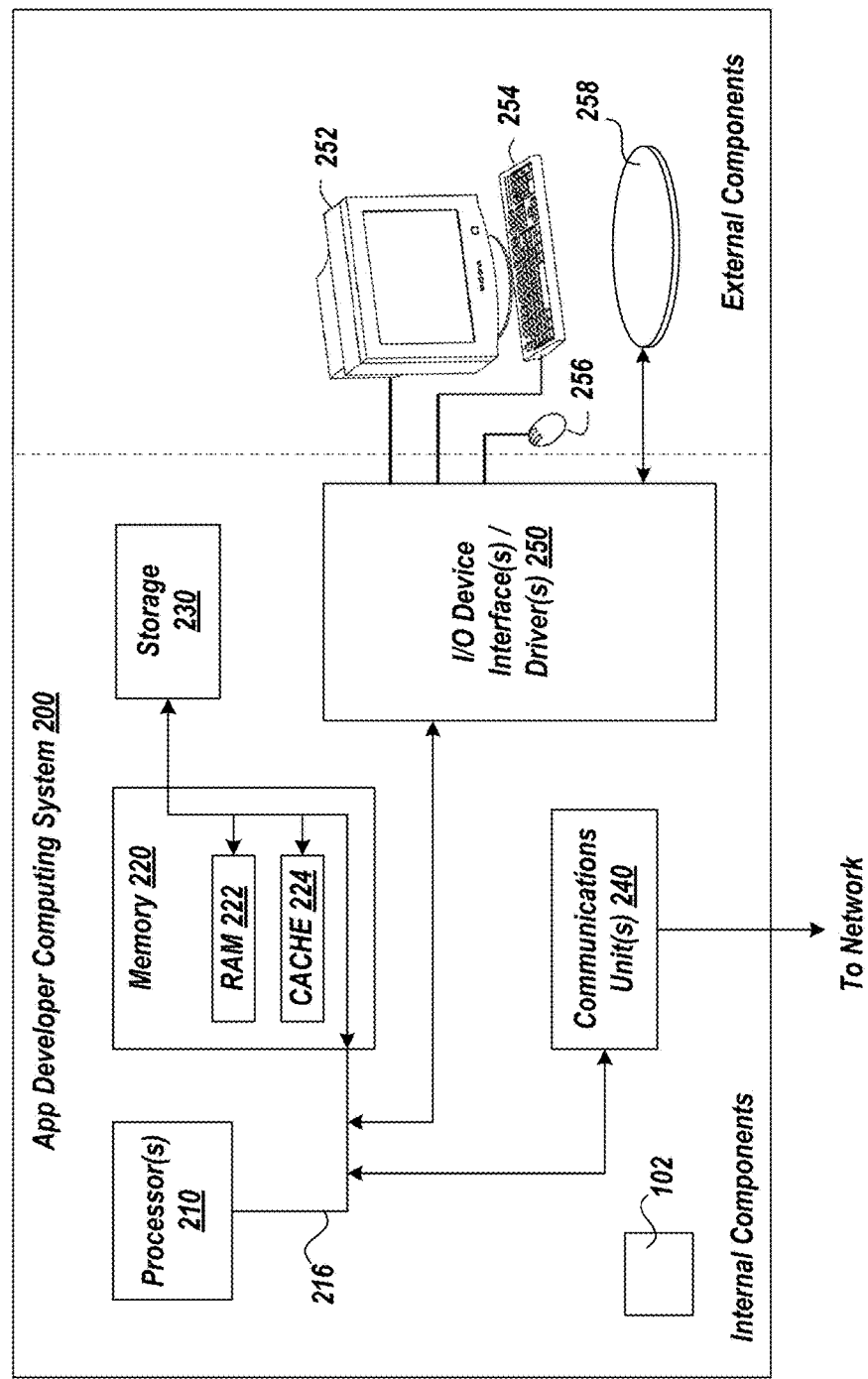
FIG. 2 illustrates an exemplary application developer computing system, according to one or more embodiments.

FIG. 2 illustrates an exemplary application developer computing system 200. Application developer computing system 200 may include respective sets of internal components and external components. Each of the sets of internal components includes bus 216, which provides communications between at least processor(s) 210, memory 220, persistent storage 230, communications unit(s) 240, and input/output (I/O) interface(s)/driver(s) 250. Memory 220 and persistent storage 230 are examples of computer readable storage devices. Memory 220 may be, for example, one or more random access memories (RAM) 222, cache memory 224, or any other suitable non-volatile or volatile storage device.

Application 102 is developed within application developer computing system 200. Persistent storage 230 can include one or more of flash memory, magnetic disk storage device of an internal hard drive, a solid state drive, a semiconductor storage device, read-only memory (ROM), EPROM, or any other computer-readable storage device that is capable of storing program instructions or digital information.

Communications unit(s) 240 provides for communications with other data processing systems or devices. Communications unit(s) 240 may include one or more network interface cards and may provide communications through the use of either or both physical and wireless communications links. Application 102 is developed by application developer computing system 200 and may subsequently be downloaded by mobile computing system 100.

I/O device interface(s)/driver(s) 250 allows for input and output of data with other external components connected to application developer computing system 200. For example, I/O device interface(s)/driver(s) 250 may provide a connection to an external display 252, an external keyboard 254, an external mouse 256, an external storage media 258, and/or some other suitable input/output device.

Figure 3:
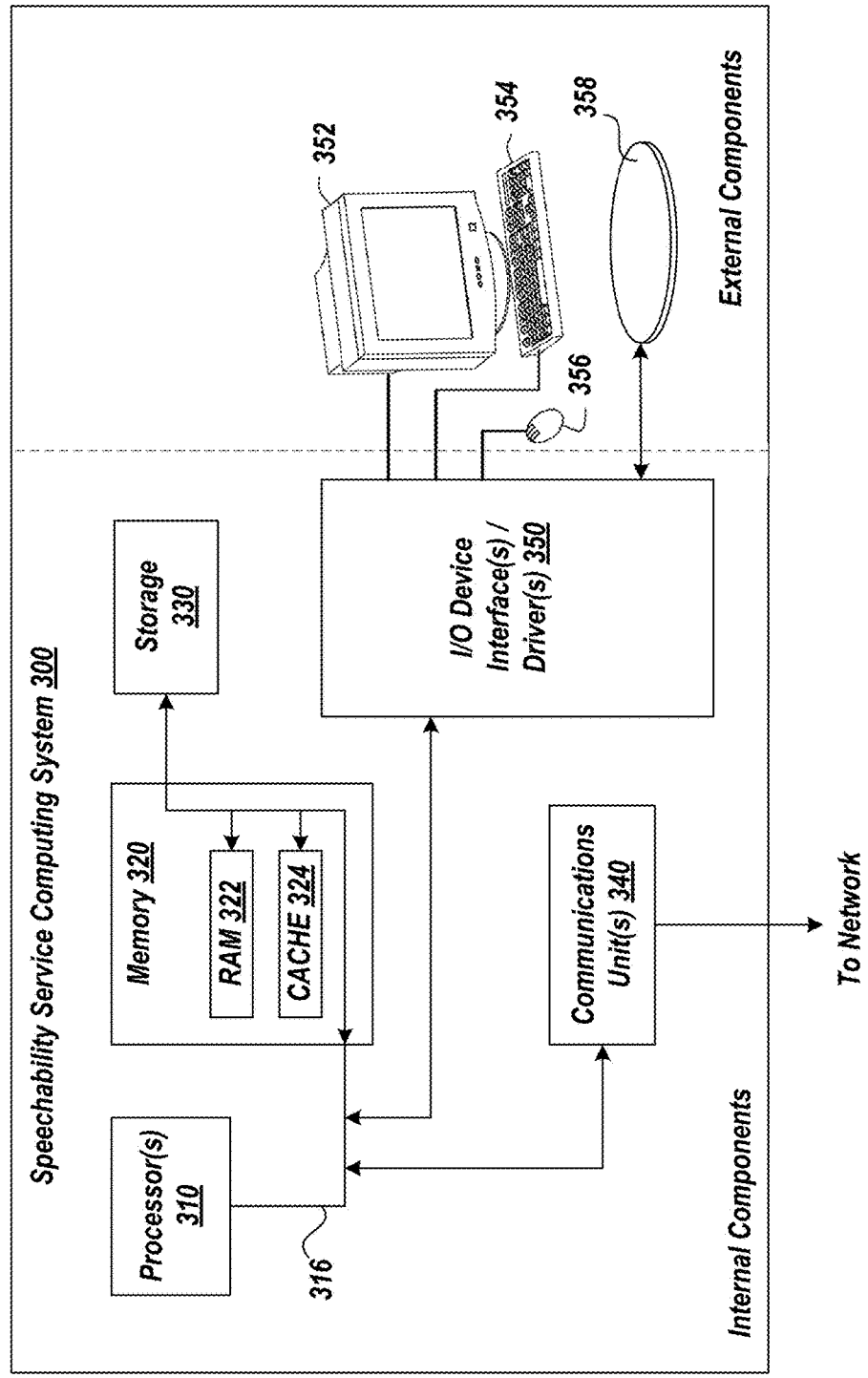
FIG. 3 illustrates an exemplary speechability service computing system, according to one or more embodiments.

FIG. 3 illustrates an exemplary speechability service computing system 300. Speechability service computing system 300 may be utilized in the present embodiments of the invention where GUI screen parser is utilized as a service by the application developer computing system 200. Speechability service computing system 300 may include respective sets of internal components and external components. Each of the sets of internal components includes bus 316, which provides communications between at least processor(s) 310, memory 320, persistent storage 330, communications unit(s) 340, and input/output (I/O) interface(s)/driver(s) 350. Memory 320 and persistent storage 330 are examples of computer readable storage devices. Memory 320 may be, for example, one or more random access memories (RAM) 322, cache memory 324, or any other suitable non-volatile or volatile storage device.

GUI screens of application 102 may be analyzed within speechability service computing system 300. A speechability output data structure may be generated by speechability service computing system 300 and provided to application developer computing system 200. The speechability output data structure includes a speechability score associated with the analyzed GUI screens and/or GUI objects and may be used by application developer computing system 200 to determine which GUI screens and/or GUI objects should be supplemented with a VUI. The VUI may be subsequently added to application 102 during development within application developer computing system 200.

Persistent storage 330 can include one or more of flash memory, magnetic disk storage device of an internal hard drive, a solid state drive, a semiconductor storage device, read-only memory (ROM), EPROM, or any other computer-readable storage device that is capable of storing program instructions or digital information. Communications unit(s) 340 provides for communications with other data processing systems or devices. Communications unit(s) 340 may include one or more network interface cards and may provide communications through the use of either or both physical and wireless communications links.

I/O device interface(s)/driver(s) 350 allows for input and output of data with other external components connected to application developer computing system 300. For example, I/O device interface(s)/driver(s) 350 may provide a connection to an external display 352, an external keyboard 354, an external mouse 356, an external storage media 358, and/or some other suitable input/output device. In some embodiments, speechability service computing system 300 may take the form of a non-user type electronic system, such as a server computer, and may therefore be devoid of external display 352, external keyboard 354, external mouse 356, and the like.

Referring to FIG. 1-FIG. 3, the term "computing system" is used herein for convenience only, and in various embodiments is a more general appropriate data handling system, such as a mobile phone, tablet, server computer, wearable device, etc. In a particular embodiment, computing system 100 is a smart phone, computing system 200 is a client computer such as desk top computer, and computing system 300 is a host computer such as a server.

In particular embodiments, there may be multiple computers that make up computing system 200. Likewise, in particular embodiments, there may be multiple computers that make up computing system 300. In these embodiments, each similar computer is connected to at least one other similar computer via a network. For example, the application 102 may be developed by a team of developers with each developer utilizing his or her own computing system 200. Likewise, GUI screens of the application 102 may be analyzed by numerous computing systems 300.

Each of the computing systems of the embodiments contains one or more general-purpose programmable processor. In some computing systems, the computing system contains multiple processors typical of a relatively large system such as a server computer. Each processor executes instructions stored in the memory and may comprise one or more levels of on-board cache.

The RAM 122, 222, and/or 322 may store or encode data and programs. In an embodiment, the memory 120, 220, and/or 320 represents the entire virtual memory of the applicable computing system, and may also include the virtual memory of other similar type computing systems coupled thereto via the network. The memory 120, 220, and/or 320 may be conceptually a single monolithic entity, but in other embodiments the memory 120, 220, and/or 320 is a more complex arrangement, such as a hierarchy of caches and other memory devices. For example, memory 120, 220, and/or 320 may exist in multiple levels of caches, and these caches may be further divided by function, so that one cache holds instructions while another holds non-instruction data, which are read or otherwise operated upon by the appropriate processor 110, 210, or 310. Memory 120, 220, and/or 320 may be further distributed and associated with different similarly functioning appropriate processors 110, 210, or 310 or sets of appropriate processors 110, 210, or 310, as is known in any of various so-called non-uniform memory access (NUMA) computer architectures.

Memory 120, 220, and/or 320 stores or encodes an operating system and one or more applications. Although the operating system and applications may be viewed as being contained within the appropriate memory 120, 220, and/or 320, in other embodiments some or all of them may be on a different but similarly functioning computer system and may be accessed remotely, e.g., via the network. The computing system 100, 200, and/or 300 may use virtual addressing mechanisms that allow the programs of the computer 100 to behave as if they have access to a large, single storage entity instead of access to multiple, smaller storage entities. Thus, operating system and applications may not be completely contained in the same storage device at the same time. In an embodiment, the operating system and applications each comprise instructions or statements that execute on the one or more processors 110, 210, or 310 and/or instructions or statements that are called by the instructions or statements that execute on the one or more processors 110, 210, or 310 to carry out the functionality described below. When such program instructions are able to be run by the one or more processors 110, 210, or 310, such computing system becomes a particular machine configured to carry out such instructions.

Processors 110, 210, and/or 310 may function as a general-purpose programmable graphics processor unit (GPU) that builds images (e.g. a GUI) for output to a display. The GPU, working in conjunction with one or more applications, determines how to manipulate pixels of display, such as touch screen, to create a display image or user interface. Ultimately, the image (e.g. GUI, etc.) is displayed to a user via the display. The processors 110, 210, and/or 310 and GPU may be discrete components interconnected by one or more busses or may be integrated into a single component.

Although the bus 116, 216, 316 is shown as a relatively simple, single bus structure providing a direct communication path among the processors, memory, and the I/O device interface/driver, in fact the bus 116, 216, and/or 316 may comprise multiple different buses or communication paths, which may be arranged in any of various forms, such as point-to-point links in hierarchical, star or web configurations, multiple hierarchical buses, parallel and redundant paths, or any other appropriate type of configuration.

Communication unit(s) 140, 240, and/or 340 may contain electronic components and logic to adapt or convert data of one protocol to another protocol. Therefore, communication unit(s) 140, 240, and/or 340 may connect a wide variety of devices or other computers to the appropriate computing system 100, 200, and/or 300, such as, but not limited to, servers, computers, bus adapters, PCI adapters, PCIe adapters, NVLink adapters, using one or more protocols including, but not limited to, Token Ring, Gigabit Ethernet, Ethernet, Fibre Channel, SSA, Fibre Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics connections, etc.

The network may be any suitable network or combination of networks and may support any appropriate protocol suitable for communication of data and/or code to/from the various computing systems. In various embodiments, the network may represent a data handling device or a combination of data handling devices, either connected directly or indirectly to the computing systems. For example, computing system 100 may download the application 102 from computing system 300 by the network or from a particular network (e.g., a seller device) that connects the computing system 100 and computing system 200 and computing system 200 may receive the speechability output data structure from computing system 300 directly or from a particular network that connects computing system 200 and computing system 300. For clarity, though one network is referred to, any number of networks (of the same or different types) may be present.

In another embodiment, the network may support wireless communications. In another embodiment, the network may support hard-wired communications, such as a telephone line or cable. In another embodiment, the network may be the Internet and may support IP (Internet Protocol). In another embodiment, the network is implemented as a local area network (LAN) or a wide area network (WAN). In another embodiment, the network is implemented as a hotspot service provider network. In another embodiment, the network is implemented as any appropriate cellular data network, cell-based radio network technology, or wireless network. In another embodiment, the network is implemented as any suitable network or combination of networks.

FIG. 1-FIG. 3 are intended to depict the representative major components of the applicable computing system. The individual components may have greater complexity than represented in the figures, components other than or in addition to those shown the figures may be present, and the number, type, and configuration of such components may vary.

Figure 4:
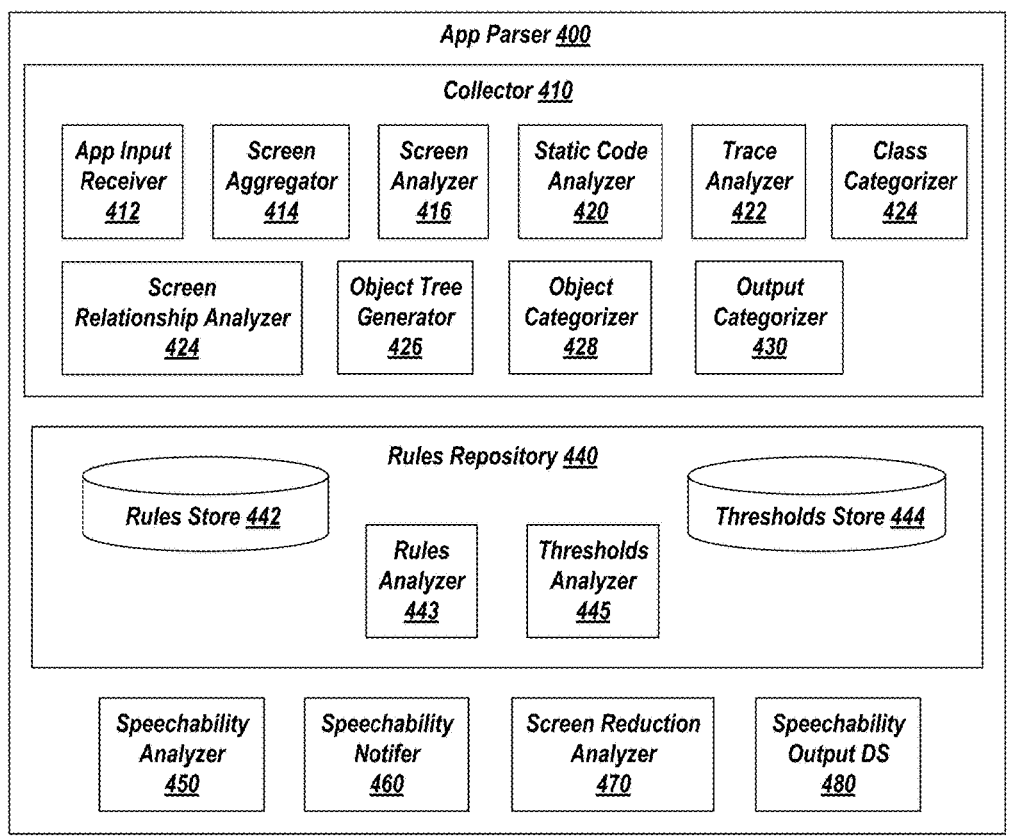
FIG. 4 illustrates an exemplary GUI screen parser, according to one or more embodiments.

FIG. 4 illustrates an exemplary GUI screen parser 400. Parser 400 is program instruction application stored within computing system 200 or, alternatively, stored within computing system 300. Parser 400 analyzes GUI screens of application 102 and generates a speechability score for the GUI screens and/or GUI objects. Parser 400 includes the speechability score for the GUI screens and/or GUI objects within speechability output data structure 480 that is read by computing system 200 to determine whether to add a VUI to particular application 102 GUI screens.

Parser 400 may include a collector 410, a rules repository 440, a speechability analyzer 450, a speechability notifier 460, a screen reduction analyzer 470, and/or a speechability output data structure 480. The collector 410 generally collects application 102 information and analyzes the collected application 102 information so that a speechability score may be determined for application 102 GUI screens. The rules repository 440 establishes and updates the importance of various GUI objects that are within GUI screens so that a speechability score may be determined for application 102 GUI screens. Speechability analyzer 450 calculates a speechability score for application 102 GUI screens and/or GUI objects within application 102 GUI screens using information from collector 410 and rules repository 440. Speechability analyzer 450 also generates the speechability output data structure 480. The Speechability notifier 460 delivers the speechability output data structure 480 to computing system 200 in the embodiments where parser is located within computing system 300. The screen reduction analyzer determines which application 102 GUI screens are related and determines whether application 102 user experience or user efficiency may be increased with the addition or integration of a VUI to those application 102 GUI screens.

The collector 410 may include an application input receiver 412, GUI screen aggregator 414, GUI screen analyzer 416, static code analyzer 410, tracer 422, application class categorizer 424, GUI object tree generator 426, GUI object categorizer 428, I/O categorizer 430, and/or relationship analyzer 432.

Application input receiver 412 receives input data structures associated with application 102. For example, input receiver 412 receives the executable file of application 102, receives screen shots of application 102 GUI, receives application 102 code, receives application 102 mockup file(s), receives application 102 storyboard(s), or the like.

GUI screen aggregator 414 identifies GUI screens from the information received by application input receiver 412 and aggregates or otherwise assembles the GUI screens for efficient subsequent digital analysis. For example, GUI screen aggregator 414 aggregates various GUI screens from the executed application 102, GUI screen aggregator 414 aggregates the screen shots of application 102 GUI, GUI screen aggregator 414 aggregates GUI screens from a GUI screen directory within the application 102 executable file, GUI screen aggregator 414 aggregates GUI screens from application 102 mockup file(s), GUI screen aggregator 414 aggregates GUI screens from application 102 storyboard(s), or the like.

GUI screen analyzer 416 conducts digital optical object recognition (00R) techniques upon the aggregated GUI screens to determine the GUI objects that are located within each respective GUI screen. The GUI screen analyzer 416 may utilize optical character recognition (OCR), or the like, to determine GUI text objects within GUI screens, may utilize optical image recognition (OIR), or the like to determine GUI image objects within GUI screens, etc. Once the GUI screen analyzer 416 determines text GUI objects and image GUI objects, the GUI screen analyzer 416 may conduct post-processing analysis to determine whether any of the determined text GUI objects and image GUI objects are further associated or better associated as audio GUI objects and/or video GUI objects. For example, to determine if a text particular GUI object or a particular image GUI object is associated with or better classified as an audio GUI object, the GUI screen analyzer 416 may identify the existence of predetermined GUI objects that indicate the particular GUI object or the particular image GUI is an audio GUI object. In an implementation, the predetermined GUI objects may be a play GUI object that is known to signify playing of an audio track, a forward GUI object that is known to signify skipping of a portion or an entire audio track, a reverse GUI object that is known to signify returning to a previous portion or a previous audio track. In this implantation if a threshold number of such predetermined GUI objects exist, the GUI screen analyzer 416 may determine that an image GUI object is associated with an audio GUI object. Similar post-processing analysis may be conducted by GUI screen analyzer 416 to determine whether any of the determined text GUI objects and image GUI objects are further associated or better associated as video GUI objects.

Static code analyzer 420 statically scans code or program instructions of application 102 to determine which GUI objects are located within GUI screens. Static code analyzer 420 analyzes the computer software of application 102 without executing the application 102. In an implementation, static code analyzer 420 scans some version of the source code of application 102, and in the other implementations, static code analyzer 420 scans some version of the object code of application 102. In some embodiments, the scan of application 102 may determine the available GUI objects that the application 102 may utilize by scanning a library or directory of application 102 that contains references to such GUI objects. In various embodiments, static code analyzer 420 may also scan the code of application 102 to determine whether a GUI object is a text GUI object, image GUI object, audio GUI object, or video GUI object. In various embodiments, static code analyzer 420 may also statically scan the code of application 102 to determine the hierarchical relationship(s) of GUI objects within GUI screens.

Tracer 422 executes the application 102 and simulates user interaction with the GUI of application 102 and/or traces in-memory (e.g. memory 220, 320) activity of the application 102 being executed to determine which GUI objects are located within GUI screens. In the user simulation modality, tracer 422 may sequentially execute the application 102 and iteratively change the simulated user interactions with the GUI of application 102 with each sequential execution to determine the various GUI objects with GUI screens; to determine whether a GUI object is a text GUI object, image GUI object, audio GUI object, or video GUI object; and/or to determine the hierarchical relationship(s) of GUI objects within GUI screens. In the in-memory tracer modality, tracer 422 determines the various GUI objects with GUI screens by tracing in-memory changes during various executions of application 102; determines whether a GUI object is a text GUI object, image GUI object, audio GUI object, or video GUI object by tracing in-memory changes during various executions of application 102; and/or determines the hierarchical relationship(s) of GUI objects within GUI screens by tracing in-memory changes during various executions of application 102.

In an embodiment, an output of GUI screen analyzer 416, static code analyzer 420, and tracer 422 may be a list of the GUI objects within the GUI screens of application 102 identified by GUI screen aggregator 414.

Class categorizer 424 categorizes the class of application 102 based upon the information received by application input receiver 412 and/or based upon the analysis of GUI screen analyzer 416, static code analyzer 420, and/or tracer 422. For example, class categorizer 424 may classify the application 102 as a business application, consumer application, gaming application, photo application, video application, entertainment application, book application, catalog application, educational application, finance application, food & drink application, health & fitness application, children's application, lifestyle application, periodical application, medical application, music application, navigation application, news application, productivity application, social networking application, sports application, travel application, utilities application, and/or weather application. The classification of application 102 is utilized to specify which rule set is applicable to application 102 in order to subsequently determine the speechability scores for GUI screens and/or GUI objects of the application 102.

If not otherwise provided by GUI screen analyzer 416, static code analyzer 420, and/or tracer 422, GUI object tree generator 426 generates a hierarchical GUI object tree of each GUI object per GUI screen. The object tree generator 426 hierarchically organizes the information generated by GUI screen aggregator 414, GUI screen analyzer 416, static code analyzer 420, and/or tracer 422. The object tree generator 426 may designate an identifier of the GUI screen as a root node and each GUI object within that GUI screen as primary leaf nodes. The object tree generator 426 may further designate the determined category (e.g., text, image, audio, video, and the like) of each of the GUI objects as a secondary leaf node of the applicable primary leaf node. In an embodiment, object tree generator 426 may not only include those GUI objects that are present within the GUI screen within the hierarchical GUI object tree, object tree generator 426 may also include all of the available GUI objects that may be included within the GUI screen. For example, if one particular image GUI object is presently included within the GUI screen and it is determined that there are nine other different image GUI objects that could have taken the place of the particular image GUI object, object tree generator 426 may include all ten image GUI objects as nodes within the hierarchical GUI object tree.

If not otherwise provided by GUI screen analyzer 416, static code analyzer 420, and/or tracer 422, GUI object categorizer 428 classifies each determined GUI object into a GUI object class. For example, GUI object categorizer 428 determines whether a particular GUI object is a text GUI object, an image GUI object, an audio GUI object, and/or a video GUI object.

If not otherwise provided by GUI screen analyzer 416, static code analyzer 420, and/or tracer 422, I/O categorizer 430 classifies each determined GUI object into a GUI input/output class. For example, I/O categorizer 430 determines a particular GUI object is an input GUI object if that particular GUI object is configured to generate input data utilized by application 102 and determines a particular GUI object is an output GUI object if that particular GUI object is configured to present output data by application 102.

Rules repository 440 may include a rules store 442, rules analyzer 443, thresholds store 444, and/or thresholds analyzer. Rules store 442 stores information related to weightings or importance of whether a particular GUI object is a particular class of GUI object when determining the speechability score of an associated GUI screen per class of the associated application 102. For example, rules store 442 stores a particular rule set that indicates that when application 102 has a music application class, the weight or importance of audio GUI objects is high. Likewise, thresholds store 444 stores information related to where to place a speechability threshold in relation to the speechability scores of GUI screens such that those GUI screens with a speechability score above the threshold are considered ripe to add a VUI thereto and those GUI screens with a speechability score below the threshold are not considered ripe to add a VUI thereto per application 102 class. For example, thresholds store 444 stores a particular threshold rule set that indicates that when application 102 has a gaming application class, the threshold should be set such that only the GUI screens associated with the highest five percent of speechability scores would be considered ripe to add a VUI thereto.

Rules analyzer 443 determines the appropriate rule set for subsequent utilization to determine the speechability score of an associated GUI screen. Rules analyzer 443 may determine which class the application 102 is via class categorizer 424 to determine the proper rule set. In another implementation, rules analyzer 443 may utilize input data from computing system 200 to determine the proper rule set. For example, computing system 200 may indicate that application 102 is a gaming application and application 102 should therefore be parsed against a gaming rule set. Rules analyzer 443 may also manage updating of one or more preexisting rule sets within store 442. For example, rules analyzer 443 may send a ranked list of GUI screens based upon each associated speechability score that are each calculated from a preexisting rule set to a test electronic device. The test electronic device may return to rules analyzer 443 a re-ranked list. Rules analyzer 443 determines the logic utilized by the test device to re-rank the list and adjusts the preexisting rule set accordingly. For example, if the re-ranked list of GUI screens indicate that audio GUI objects as a very important indicator as to whether a VUI would be beneficial, rules analyzer 443 increases the weighting of audio GUI objects within the applicable rule set.

Thresholds analyzer 445 determines the value of the speechability score threshold for subsequent utilization to determine which GUI screens are indicated as being potentially benefited from the addition of a VUI. Thresholds analyzer 445 may determine which class the application 102 is via class categorizer 424 to determine the proper threshold. In another implementation, rules analyzer 445 may utilize input data from computing system 200 to determine the proper threshold. For example, computing system 200 may indicate that parser 400 should identify only the top five percent of GUI screens that would most benefit from the addition of the VUI. Thresholds analyzer 445 may also manage updating of one or more preexisting thresholds within store 444. For example, thresholds analyzer 445 may send a ranked list of GUI screens based upon each associated speechability score that are each calculated from a rule set along with a preexisting threshold to a test electronic device. The test electronic device may return to thresholds analyzer 445 a re-ranked list. Thresholds analyzer 445 determines the difference in the number of GUI screens that were above the threshold in the original list versus the re-ranked list and adds or subtracts from the preexisting speechability threshold as appropriate. For example, if the re-ranked list of GUI screens add thirty GUI screens above the pre-existing threshold, thresholds analyzer 445 decreases the threshold subsequently utilized so that more GUI screens would be indicated as being higher than the threshold and therefore be identified as being candidates for the addition of an appropriate VUI.

Speechability analyzer 450 calculates a speechability score for a GUI screen by combining the determined GUI objects within the GUI screen with components of the rule set obtained from rules store 442. The speechability analyzer 450 may total the number of text GUI objects within the GUI screen, total the number of image GUI objects within the GUI screen, total the number of audio GUI objects with the GUI screen, and total the number of video objects with the GUI screen. To determine the speechability score for the GUI screen, the speechability analyzer 450 may determine a text speechability score by combining the total number of text GUI objects with the text weighting component indicated by the rule set, may determine a image speechability score by combining the total number of image GUI objects with the image weighting component indicated by the rule set, may determine a audio speechability score by combining the total number of audio GUI objects with the audio weighting component indicated by the rule set, and/or may determine a video speechability score by combining the total number of video GUI objects with the video weighting component indicated by the rule set. The speechability score for the GUI screen may be the combination of such sub-component GUI object speechability scores. For example, the speechability score for a GUI screen may be the combination the text GUI object speechability score, the image GUI object speechability score, the audio GUI object speechability score, and the video GUI object speechability score. Speechability analyzer 450 generates the speechability output data structure 480. The output data structure 480 may include an identifier of a GUI screen associated with the calculated speechability score for each identified GUI screen. The output data structure 480 may be a linked data pair, a table, graph, or other type of data structure. The output data structure 480 may further include the indication of the applicable speechability threshold. For example, output data structure 480 may highlight those GUI screens that have a speechability score higher than the speechability threshold thereby indicating those GUI screens as being candidates for the addition of an appropriate VUI. In an embodiment, the output data structure 480 includes only those GUI screens that have a speechability score higher than the speechability threshold. In embodiments, the output data structure further includes an indication of related GUI screens that may benefit from a VUI being added such that the number of related GUI screens displayed to the user of application 102 may be reduced with the addition of the VUI. In some embodiments, those related GUI screens that would benefit from the VUI may be added above the speechability threshold. That is, there is the same indication within the data structure 480 of (a) GUI screens that have a speechability score above the threshold and (b) related GUI screens that may benefit from a VUI being added such that the number of related GUI screens displayed to the user of application 102 may be reduced with the addition of the VUI. In another embodiment, (a) those GUI screens that have a speechability score above the threshold are indicated within the data structure 480 separately to (b) those related GUI screens that may benefit from a VUI being added such that the number of related GUI screens displayed to the user of application 102 may be reduced with the addition of the VUI.

The screen reduction analyzer 470 determines which application 102 GUI screens are related and determines whether application 102 user experience or user efficiency may be increased with the addition or integration of a VUI to those application 102 GUI screens. The screen reduction analyzer 470 may utilize relationship information obtained by GUI screen relationship analyzer 432. GUI screen relationship analyzer 432 may determine that GUI screens are related if they share the same GUI object. The GUI screen relationship analyzer 432 may further determine that GUI screens are related if they share the same GUI object if there is a pointer or target associated with one GUI screen points or identifies the other GUI screen. The pointer/target may be identified during execution of application 102 and/or during the static code scan of application 102 or specified ordering of GUI screens specified by the GUI storyboard(s) and/or mockup(s).

Figure 5:
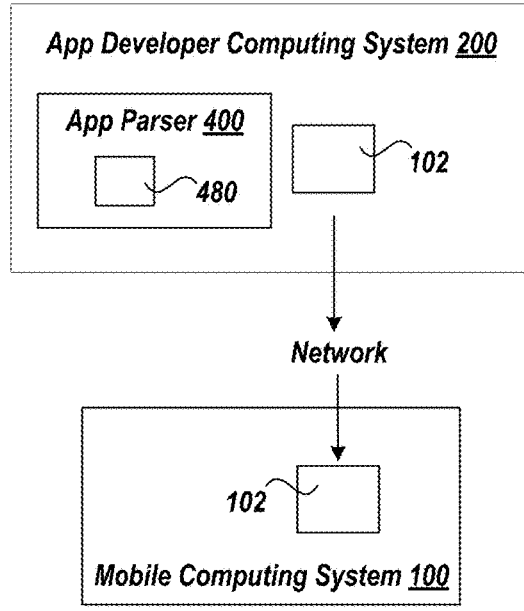
FIG. 5 illustrates an exemplary scheme wherein the GUI screen parser is local to the application developer computing system, according to one or more embodiments.

FIG. 5 illustrates an exemplary scheme wherein the GUI screen parser 400 is local to the application developer computing system 200. In these embodiments, the parser 400 inputs application 102 input information that is local to system 200, or the like computing device, and generates the output data structure 480 and outputs at least a portion of the output data structure 480 upon an I/O device associated with system 200 to notify system 200 which GUI screens of application 102 have a speechability score higher than the speechability threshold, and are thus ripe candidates for a VUI to be added to those GUI screens to improve mobile computing system 100 efficiency, functionality, or user experience when executing application 102 and/or notify system 200 which related GUI screens of application 102 may be consolidated by adding a VUI to improve mobile computing system 100 efficiency, functionality, or user experience when executing application 102. Upon implementation of one or more VUIs to application 102, mobile system 100 may receive application 102 directly from system 200 or another like computing device that is owned, maintained, controlled, by the same entity that owns, maintains, controls, etc. computing system 200. Alternatively, upon implementation of one or more VUIs to application 102, mobile system 100 may receive application 102 indirectly from system 200 or another like computing device that is owned, maintained, controlled, by the same entity that owns, maintains, controls, etc. computing system 200 by a $3^{rd}$ party computing system, such as an application retailer computing system. When parser 400 is located in computing system 200, it may be evoked by the processor 210 by way of memory 220 to cause the system 200 to carry out the functions highlighted herein.

Figure 6:
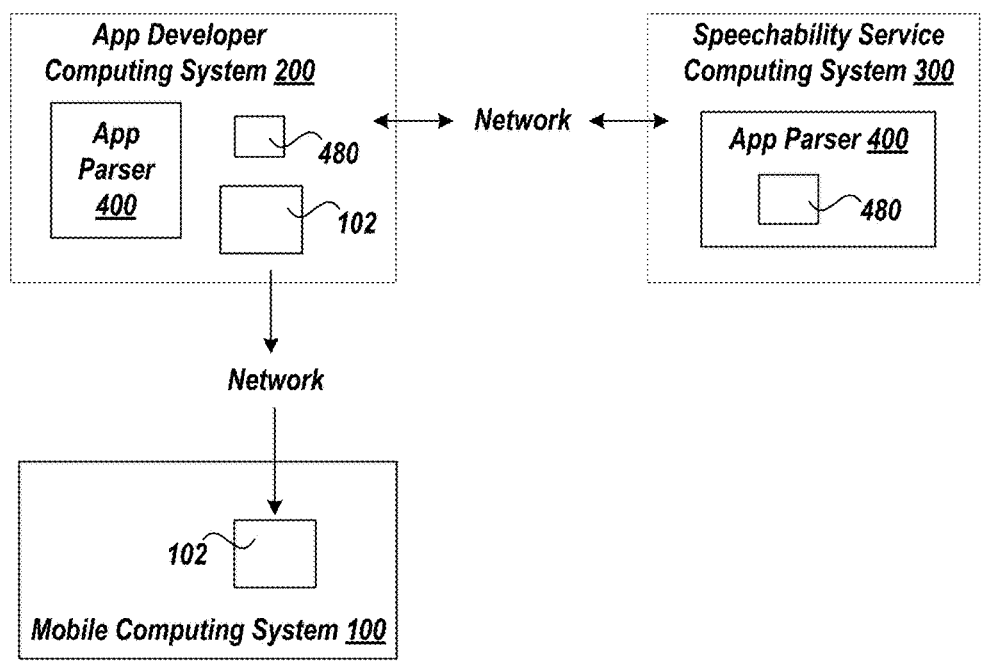
FIG. 6 illustrates an exemplary scheme wherein the GUI screen parser is local to the speechability service computing system, according to one or more embodiments.

FIG. 6 illustrates an exemplary scheme wherein the GUI screen parser 400 is local to the speechability service computing system 300. In these embodiments, the parser 400 inputs application 102 input information received from system 200, or the like computing device, and generates the output data structure 480 and sends at least a portion of the output data structure 480 to computing system 200 which may then be outputted upon an I/O device associated with system 200 to notify system 200 which GUI screens of application 102 have a speechability score higher than the speechability threshold, and are thus ripe candidates for a VUI to be added to those GUI screens to improve mobile computing system 100 efficiency, functionality, or user experience when executing application 102 and/or notify system 200 which related GUI screens of application 102 may be consolidated by adding a VUI to improve mobile computing system 100 efficiency, functionality, or user experience when executing application 102. Upon implementation of one or more VUIs to application 102, mobile system 100 may receive application 102 directly from system 200 or another like computing device that is owned, maintained, controlled, by the same entity that owns, maintains, controls, etc. computing system 200. Alternatively, upon implementation of one or more VUIs to application 102, mobile system 100 may receive application 102 indirectly from system 200 or another like computing device that is owned, maintained, controlled, by the same entity that owns, maintains, controls, etc. computing system 200 by a $4^{th}$ party computing system, such as an application retailer computing system. When parser 400 is located in computing system 300, it may be evoked by the processor 310 by way of memory 320 to cause the system 300 to carry out the functions highlighted herein.

Figure 7:
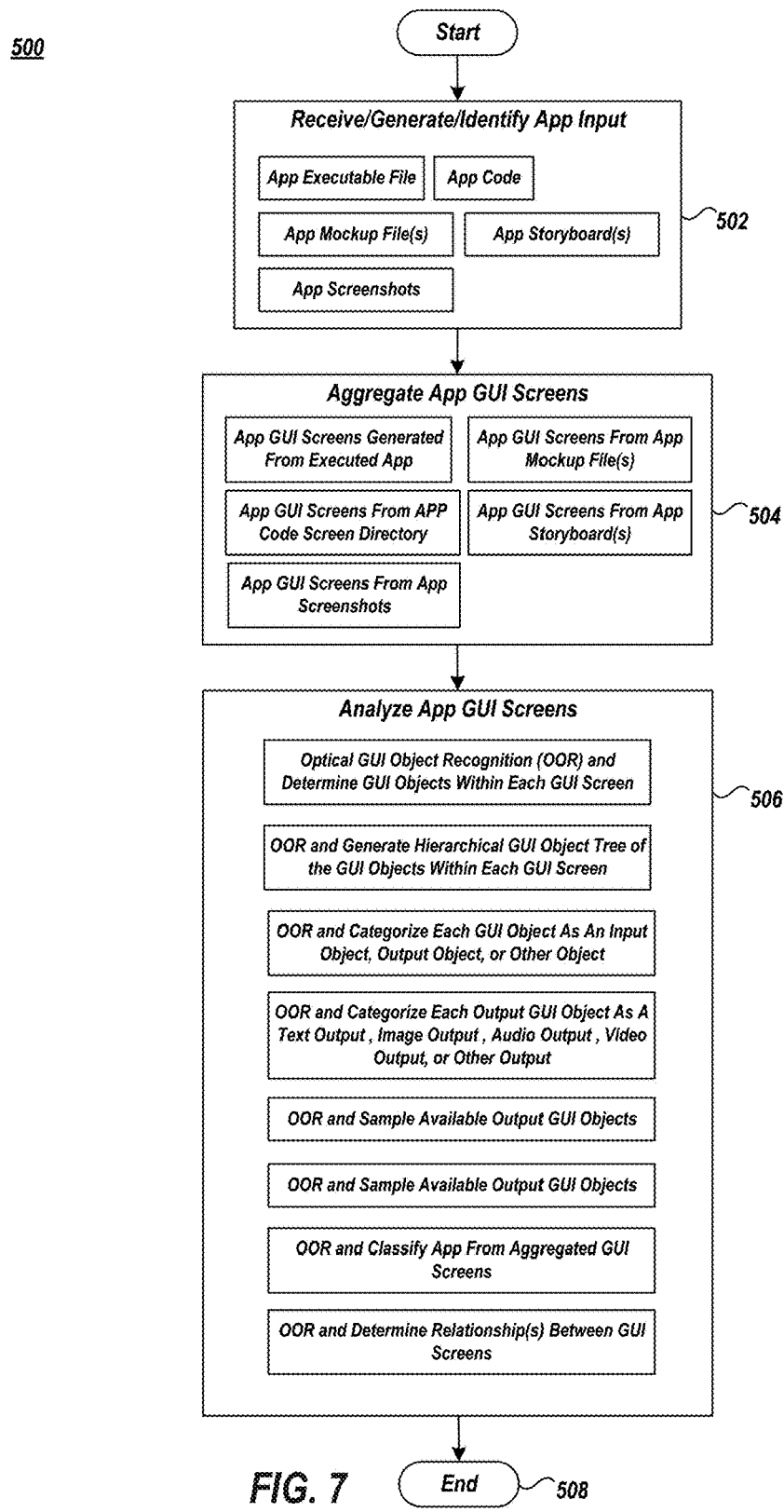
FIG. 7 illustrates a method for the GUI screen parser to analyze GUI screens, according to one or more embodiments.

FIG. 7 illustrates a method 500 for the GUI screen parser 400 to analyze GUI screens of application 102. Method 500 may be utilized GUI screen parser 400 to optically analyze GUI screens. Method 500 begins by parser 400 receiving, generating, or otherwise identifying application 102 input information (block 502). For example, application input receiver 412 receives an executable file of application 102, receives static code of application 102, receives one or more mockup files(s) of GUI screens of application 102, receives one or more application 102 storyboards that contain GUI screens, receives one or more screenshots of application 102 GUI screens, or the like.

Method 500 may continue by GUI screen parser 400 aggregating, assembling, or otherwise gathering GUI screens (block 504). For example, screen aggregator 414 may take a screen shot of the GUI of evoked application 102 after each change to the GUI, after a threshold time period elapses, after a threshold number of interactions or engagements of GUI objects is exceeded, or the like. In another example, screen aggregator 414 may assemble GUI screens from a GUI screen directory within the executable file of application 102. In another example, screen aggregator 414 may assemble GUI screen shots received by application input receiver 412. In another example, screen aggregator 414 may assemble GUI screens from one or more mockup files(s) of application 102 or from one or more application 102 storyboards.

Method 500 may continue by GUI screen parser 400 optically analyzing the assembled GUI screens (block 506). In one example, screen analyzer 416 utilizes OCR to identify text GUI objects, utilizes OR to identify image GUI objects, and the like. Screen analyzer 416 may further identify audio GUI objects and/or video GUI objects by the presence of predetermined text GUI objects and/or image GUI objects that when used in combination with the potential audio GUI objects and/or video GUI objects are indicative that the potential audio GUI objects and/or video GUI objects are, in fact, audio GUI objects and/or video GUI objects.

The GUI screen parser 400 may further generate a hierarchical GUI object tree of the optically identified GUI objects for each GUI screen. For example, the object tree generator 426 may designate an identifier of the GUI screen as a root node and each optically identified GUI object within that GUI screen as primary leaf nodes.

The GUI screen parser 400 may further categorize or classify each GUI object optically identified as an text, image, audio, or video output GUI object. For example, I/O categorizer 430 determines a particular identified GUI object is an text output GUI object because that particular identified GUI object is configured to output text, determines a particular identified GUI object is an output image GUI object because that particular identified GUI object is configured to present image output data, determines a particular identified GUI object is an audio output GUI object because that particular identified GUI object is configured to present or control audio output data, determines a particular identified GUI object is an video output GUI object because that particular identified GUI object is configured to present or control video output data.

The GUI screen parser 400 may further categorize or classify each optically identified GUI object into a GUI object class. For example, GUI object categorizer 428 determines an optically identified GUI object is a text GUI object if the optically identified GUI object is identified by OCR analysis, determines an optically identified GUI object is a image GUI object if the optically identified GUI object is identified by OR analysis, and the like.

The GUI screen parser 400 may determine alternative GUI objects to those present in the analyzed GUI screen. A the same GUI screen may be sampled at different time instances or subsequent to different simulated user interactions with the GUI to determine the different GUI objects that may be presented in that GUI screen. In analyzing these samples of the same GUI screen, the GUI screen parser 400 may determine whether areas of the GUI screen are associated with GUI text objects, GUI image objects, GUI audio objects, and/or GUI video objects. Such areas may be so designated and each different GUI object within such areas may resultantly be classified as the applicable GUI object type. These alternative GUI objects may be included in the hierarchical GUI object tree. For example, if one particular optically identified image GUI object is presently included within the GUI screen and it is determined that there are nine other different optically identified images GUI objects that could have taken the place of the particular image GUI object, object tree generator 426 may include all ten image GUI objects as nodes within the hierarchical GUI object tree. These alternative optically identified GUI objects may also be included the component speechability score analysis of the of the GUI screen. For example, a GUI screen includes two different optically image GUI objects and it is further optically determined that one of those image GUI objects has five other alternative GUI image objects. Here, the speechability score image component may be the summation of all available image GUI object within the GUI screen (i.e., the two different image GUI objects present in the GUI screen plus the five alternative image GUI objects associated with one of the two different image GUI objects).

The GUI screen parser 400 may determine the class of application 102 based upon the information optical analysis of GUI screen analyzer 416. For example, class categorizer 424 may classify the application 102 as a business application, consumer application, gaming application, photo application, video application, entertainment application, book application, catalog application, educational application, finance application, food & drink application, health & fitness application, children's application, lifestyle application, periodical application, medical application, music application, navigation application, news application, productivity application, social networking application, sports application, travel application, utilities application, and/or weather application based upon the optically identified GUI objects.

The GUI screen parser 400 may further determine that GUI screens are related. For example, GUI screen relationship analyzer 432 may determine that GUI screens are related if they share the same optically identified GUI object. Method 500 ends at block 508.

Figure 8:
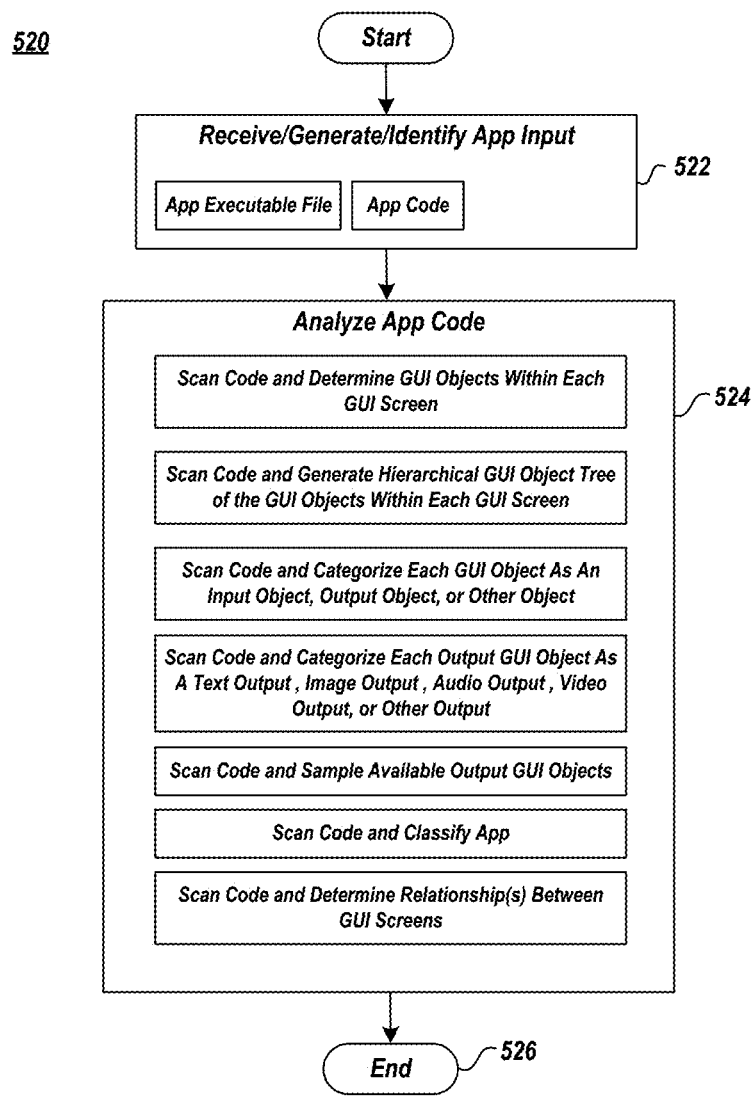
FIG. 8 illustrates a method for the GUI screen parser to analyze GUI screens, according to one or more embodiments.

FIG. 8 illustrates a method 520 for the GUI screen parser 400 to analyze GUI screens of application 102. Method 520 may be utilized GUI screen parser 400 to analyze GUI screens by statically scanning application 102 code. Method 520 begins by parser 400 receiving, generating, or otherwise identifying application 102 input information (block 522). For example, application input receiver 412 receives an executable file of application 102, receives static code of application 102, or the like.

Method 520 may continue by GUI screen parser 400 aggregating, assembling, or otherwise gathering GUI screens (block 523). For example, screen aggregator 414 may take a screen shot of the GUI of evoked application 102 after each change to the GUI, after a threshold time period elapses, after a threshold number of simulated user interactions or engagements of GUI objects is exceeded, or the like. In another example, screen aggregator 414 may assemble GUI screens from a GUI screen directory within the executable file of application 102.

Method 520 may continue by GUI screen parser 400 analyzing the assembled GUI screens by statically scanning application 102 code (block 524). In one example, static code analyzer 420 scans code of application 102 to identify text GUI objects within GUI screens, scans code of application 102 to identify image GUI objects within GUI screens, scans code of application 102 to identify audio GUI objects within GUI screens, scans code of application 102 to identify video GUI objects within GUI screens, and the like.

GUI screen parser 400 may further generate a hierarchical GUI object tree of the GUI objects identified by scanning code for each GUI screen in application 102. For example, the static code analyzer 420 and/or object tree generator 426 may designate an identifier of the GUI screen as a root node and each identified GUI object within that GUI screen as primary leaf nodes.

The GUI screen parser 400 may further categorize or classify each GUI object identified as a text, image, audio, or video output GUI object. For example, static code analyzer 420 and/or I/O categorizer 430 determines a particular identified GUI object is an text output GUI object because that particular identified GUI object is configured to output text, determines a particular identified GUI object is an output image GUI object because that particular identified GUI object is configured to present image output data, determines a particular identified GUI object is an audio output GUI object because that particular identified GUI object is configured to present or control audio output data, determines a particular identified GUI object is an video output GUI object because that particular identified GUI object is configured to present or control video output data.

The GUI screen parser 400 may further categorize or classify each GUI object identified by scanning code of application 102 into a GUI object class. For example, static code analyzer 420 and/or object categorizer 428 determines an identified GUI object is a text GUI object because the GUI object is configured to display text, determines an identified GUI object is an image GUI object because the GUI object is configured to display an image, determines an identified GUI object is an image GUI object because the GUI object associated with an audio output, determines an identified GUI object is an video GUI object because the GUI object is configured to display an video, or the like.

The GUI screen parser 400 may determine alternative GUI objects to those present in the analyzed GUI screen. The same section of code may be scanned at different time instances or subsequent to different simulated user interactions with the GUI to determine the different GUI objects that may be presented in that GUI screen. In analyzing these samples of the same code section, the GUI screen parser 400 may determine whether areas of the GUI screen are associated with GUI text objects, GUI image objects, GUI audio objects, and/or GUI video objects. Such areas may be so designated and each different GUI object within such areas may resultantly be classified as the applicable GUI object type, class, or the like. These alternative GUI objects may be included in the hierarchical GUI object tree. For example, if one particular image GUI object identified by scanning application 102 code is presently included within the GUI screen and it is determined that there are nine other different image GUI objects that could have taken the place of the particular image GUI object, static code analyzer 420 and/or object tree generator 426 may include all ten image GUI objects as nodes within the hierarchical GUI object tree. These alternative identified GUI objects may also be included the component speechability score analysis of the of the GUI screen. For example, a GUI screen includes two different image GUI objects and it is further determined that one of those image GUI objects has five other alternative GUI image objects by scanning application 102 code. Here, the speechability score image component may be the summation of all available GUI objects within the GUI screen (i.e., the two different image GUI objects present in the GUI screen plus the five alternative image GUI objects associated with one of the two different image GUI objects).

The GUI screen parser 400 may determine the class of application 102 by scanning application 102 code. For example, static code analyzer 420 and/or class categorizer 424 may classify the application 102 as a business application, consumer application, gaming application, photo application, video application, entertainment application, book application, catalog application, educational application, finance application, food & drink application, health & fitness application, children's application, lifestyle application, periodical application, medical application, music application, navigation application, news application, productivity application, social networking application, sports application, travel application, utilities application, and/or weather application based upon the identified GUI objects.

The GUI screen parser 400 may further determine that GUI screens are related. For example, static code analyzer 420 and/or GUI screen relationship analyzer 432 may determine that GUI screens are related if they share the same identified GUI object. Further, static code analyzer 420 and/or GUI screen relationship analyzer 432 may determine that GUI screens are related if they a pointer or target exists in association with a first GUI screen that points to or identifies a different GUI screen. Method 520 ends at block 526.

Figure 9:
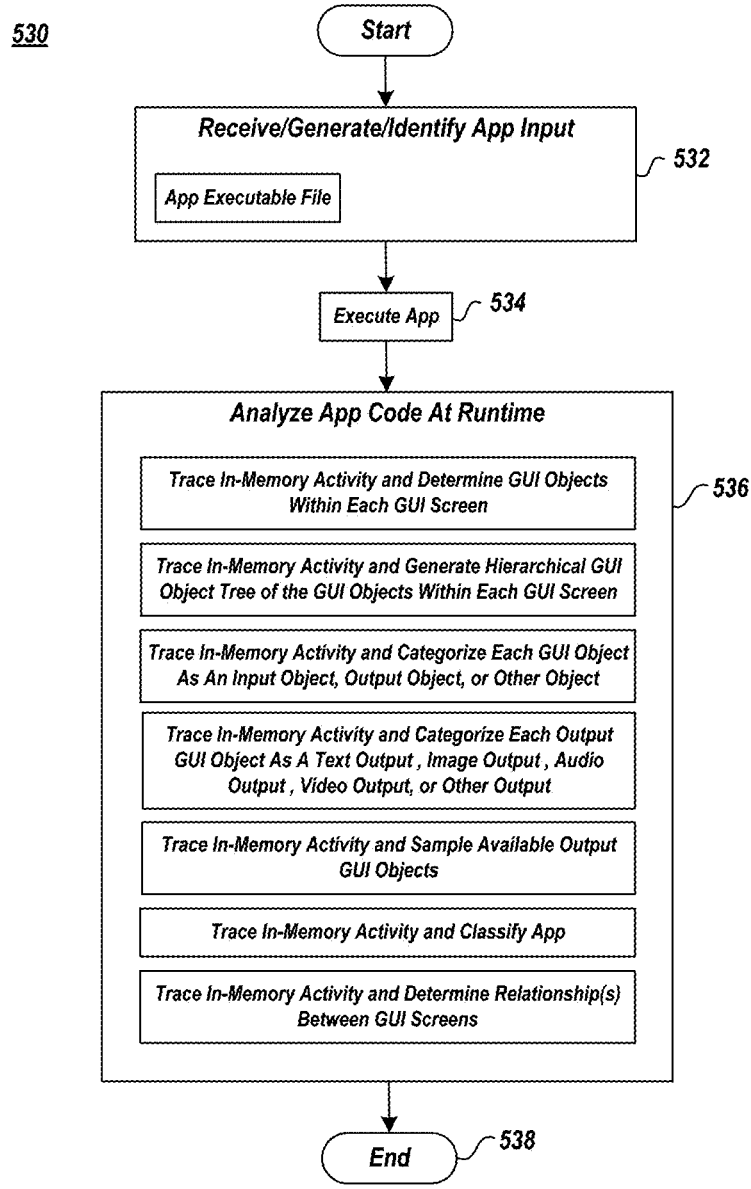
FIG. 9 illustrates a method for the GUI screen parser to analyze GUI screens, according to one or more embodiments.

FIG. 9 illustrates a method 530 for the GUI screen parser to analyze GUI screens of application 102. Method 530 may be utilized GUI screen parser 400 to analyze GUI screens by tracing in memory activity of the evoked application 102. Method 530 begins by parser 400 receiving, generating, or otherwise identifying application 102 input information (block 532). For example, application input receiver 412 receives an executable file of application 102, or the like. Method 530 continues by evoking the executable file of application 102 by processor 210 or processor 310 via memory 220 or memory 230, respectively (block 534).

Method 530 may continue by GUI screen parser 400 aggregating, assembling, or otherwise gathering GUI screens (block 535). For example, screen aggregator 414 may take a screen shot of the GUI of evoked application 102 after each change to the GUI, after a threshold time period elapses, after a threshold number of simulated user interactions or engagements of GUI objects is exceeded, or the like. In another example, screen aggregator 414 may assemble GUI screens from a GUI screen directory within the executable file of application 102.

Method 530 may continue by GUI screen parser 400 analyzing the assembled GUI screens by tracing in memory actively of the evoked application 102 (block 536). In one example, tracer 422 traces in memory activity of evoked code of application 102 to identify text GUI objects within GUI screens, traces in memory activity of evoked code of application 102 to identify image GUI objects within GUI screens, traces in memory activity of evoked code of application 102 to identify audio GUI objects within GUI screens, traces in memory activity of evoked code of application 102 to identify video GUI objects within GUI screens, and the like.

GUI screen parser 400 may further generate a hierarchical GUI object tree of the GUI objects identified tracing in memory activity of evoked application 102. For example, the tracer 422 and/or object tree generator 426 may designate an identifier of the GUI screen as a root node and each identified GUI object within that GUI screen as primary leaf nodes.

The GUI screen parser 400 may further categorize or classify each GUI object identified as a text, image, audio, or video output GUI object. For example, tracer 422 and/or I/O categorizer 430 determines a particular identified GUI object is an text output GUI object because that particular identified GUI object is configured to output text, determines a particular identified GUI object is an output image GUI object because that particular identified GUI object is configured to present image output data, determines a particular identified GUI object is an audio output GUI object because that particular identified GUI object is configured to present or control audio output data, determines a particular identified GUI object is an video output GUI object because that particular identified GUI object is configured to present or control video output data.

The GUI screen parser 400 may further categorize or classify each GUI object identified by tracing in memory activity of the evoked application 102 into a GUI object class. For example, tracer 422 and/or object categorizer 428 determines an identified GUI object is a text GUI object because the GUI object is configured to display text, determines an identified GUI object is an image GUI object because the GUI object is configured to display an image, determines an identified GUI object is an image GUI object because the GUI object associated with an audio output, determines an identified GUI object is an video GUI object because the GUI object is configured to display an video, or the like.

The GUI screen parser 400 may determine alternative GUI objects to those present in the analyzed GUI screen. The same section of evoked code may be traced at different time instances or subsequent to different simulated user interactions with the GUI to determine the different GUI objects that may be presented in that GUI screen. In analyzing these in memory traces of the same evoked code section, the GUI screen parser 400 may determine whether areas of the GUI screen are associated with GUI text objects, GUI image objects, GUI audio objects, and/or GUI video objects. Such areas may be so designated and each different GUI object within such areas may resultantly be classified as the applicable GUI object type, class, or the like. These alternative GUI objects may be included in the hierarchical GUI object tree. For example, if one particular image GUI object identified by tracing in memory activity of evoked application 102 code is presently included within the GUI screen and it is determined that there are nine other different image GUI objects that could have taken the place of the particular image GUI object, tracer 422 and/or object tree generator 426 may include all ten image GUI objects as nodes within the hierarchical GUI object tree. These alternative identified GUI objects may also be included the component speechability score analysis of the of the GUI screen. For example, a GUI screen includes two different image GUI objects and it is further determined that one of those image GUI objects has five other alternative GUI image objects by scanning application 102 code. Here, the speechability score image component may be the summation of all available GUI objects within the GUI screen (i.e., the two different image GUI objects present in the GUI screen plus the five alternative image GUI objects associated with one of the two different image GUI objects).

The GUI screen parser 400 may determine the class of application 102 by tracing in memory activity of evoked application 102. For example, static code analyzer 420 and/or class categorizer 424 may classify the application 102 as a business application, consumer application, gaming application, photo application, video application, entertainment application, book application, catalog application, educational application, finance application, food & drink application, health & fitness application, children's application, lifestyle application, periodical application, medical application, music application, navigation application, news application, productivity application, social networking application, sports application, travel application, utilities application, and/or weather application based upon the identified GUI objects.

The GUI screen parser 400 may further determine that GUI screens are related. For example, tracer 422 and/or GUI screen relationship analyzer 432 may determine that GUI screens are related if they share the same identified GUI object. Further, tracer 422 and/or GUI screen relationship analyzer 432 may determine that GUI screens are related if they a pointer or target exists in association with a first GUI screen that points to or identifies a different GUI screen. Method 530 ends at block 538.

Figure 10:
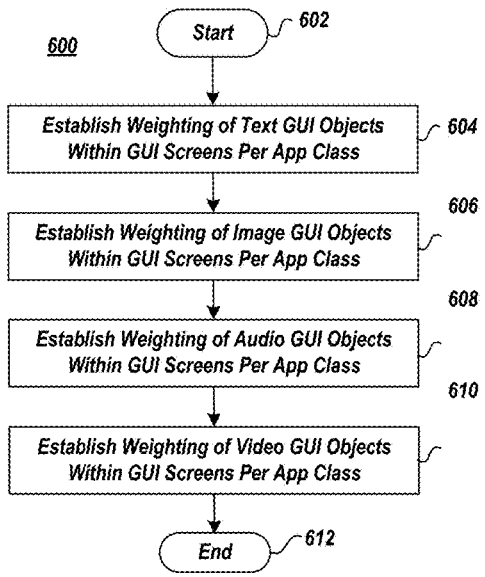
FIG. 10 illustrates a method for the GUI screen parser to establish rules to determine a speechability score for a GUI screen, according to one or more embodiments.

FIG. 10 illustrates a method 600 for the GUI screen parser 400 to establish rules to determine a speechability score for a GUI screen. Method 600 may be utilized by rules repository to establish rule or importance values associated with GUI objects within s GUI screen. Method begins at block 602 and continues with GUI screen parser 400 establish a weighting value for text GUI objects per application 102 class (block 604). For example, rules analyzer 443 sets an arbitrary value of 0.8 of text GUI objects to indicate that text GUI objects have an 80% weight when determining the speechability score of the associated GUI screen within one or more classes of application 102. Rules analyzer 443 may subsequently store the established value within rules store 442.

Method may continue with GUI screen parser 400 establish a weighting value for image GUI objects per application 102 class (block 606). For example, rules analyzer 443 sets an arbitrary value of 0.3 of image GUI objects to indicate that image GUI objects have a 30% weight when determining the speechability score of the associated GUI screen within one or more classes of application 102. Rules analyzer 443 may subsequently store the established value within rules store 442.

Method may continue with GUI screen parser 400 establish a weighting value for audio GUI objects per application 102 class (block 608). For example, rules analyzer 443 sets an arbitrary value of 0.1 of audio GUI objects to indicate that audio GUI objects have a 10% weight when determining the speechability score of the associated GUI screen within one or more classes of application 102. Rules analyzer 443 may subsequently store the established value within rules store 442.

Method may continue with GUI screen parser 400 establish a weighting value for video GUI objects per application 102 class (block 610). For example, rules analyzer 443 sets an arbitrary value of 0.5 of video GUI objects to indicate that video GUI objects have a 30% weight when determining the speechability score of the associated GUI screen within one or more classes of application 102. Rules analyzer 443 may subsequently store the established value within rules store 442. Method 600 ends at block 612.

Figure 11:
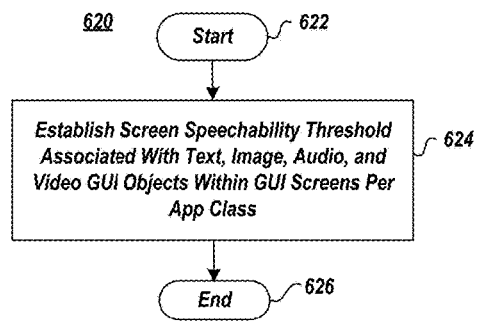
FIG. 11 illustrates a method for the GUI screen parser to establish thresholds to determine a speechability score for a GUI screen, according to one or more embodiments.

FIG. 11 illustrates a method 620 for the GUI screen parser 400 to establish thresholds in order to subsequently determine a speechability score for a GUI screen. Method 600 may be utilized by rules repository 440 to establish a speechability threshold per GUI object or per GUI screen to establish a value at which those GUI objects and/or GUI screens are identified as being candidates to add a VUI thereto or associated therewith so that user experience or efficiency of application 102 may be increased.

Method 620 begins at block 622 and continues with parser 400 establishing one or more speechability thresholds. For example, thresholds analyzer 445 sets a text speechability threshold value of 0.90 to indicate that only GUI screens that contain the top 10% of text GUI objects that would most benefit from a VUI are to be identified, sets an image speechability threshold value of 0.75 to indicate that only GUI screens that contain the top 25% of image GUI objects that would most benefit from a VUI are to be identified, sets an audio speechability threshold value of 0.30 to indicate that only GUI screens that contain the top 70% of audio GUI objects that would most benefit from a VUI are to be identified, and sets a video speechability threshold value of 0.99 to indicate that only GUI screens that contain the top 1% of video GUI objects that would most benefit from a VUI are to be identified. In another example, thresholds analyzer 445 sets an overall speechability threshold value for GUI screens. For example, thresholds analyzer 445 sets a speechability threshold value of 0.90 to indicate that the top 10% GUI screens that have the highest speechability that would most benefit from a VUI are to be identified. Method 620 ends at block 626.

Figure 12:
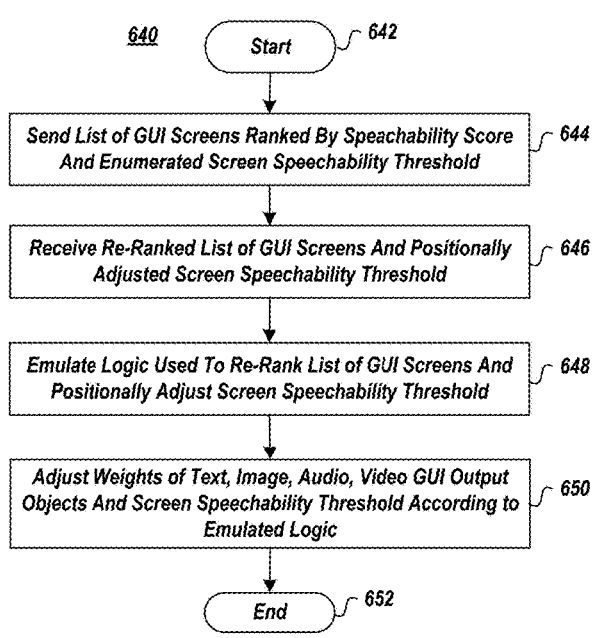
FIG. 12 illustrates a method for the GUI screen parser to update previously established rules and/or thresholds, according to one or more embodiments.

FIG. 12 illustrates a method 640 for the GUI screen parser 400 to update previously established rules and/or thresholds. Method 600 may be utilized by rules repository 440 to update a speechability threshold per GUI object or per GUI screen to update a value at which those GUI objects and/or GUI screens are identified as being candidates to add a VUI thereto or associated therewith so that user experience or efficiency of application 102 may be increased.

Method 640 begins at block 642 and continues with GUI parser 400 sending a list of GUI screens ranked by their respective speechability scores along with an enumerated threshold that indicates that those GUI screens that have a speechability threshold above the enumerated threshold are identified as being beneficial candidates to add a VUI thereto and those GUI screens that have a speechability threshold below the enumerated threshold are identified as being poor candidates to add a VUI thereto (block 644). For example, speechability notifier 460 sends the output data structure 480 to a test electronic device.

Method 640 may continue with GUI parser 400 receiving an updated and re-ranked list of GUI screens and/or positionally adjusted speechability threshold (block 646). For example, the test devices displays the initial ranked list and speechability threshold to a tester. The tester re-ranks the list according to the level the tester believes that GUI screens would be good candidates to add a VUI thereto. For example, the tester may increase the ranking of a GUI screen from below the threshold to above the threshold because that GUI screen is also a good candidate to add a VUI thereto. The tester may also positionally adjusts the speechability threshold. For example, if the speechability threshold is originally positioned such that there are ten GUI screens that have a speechability score above the threshold, the tester may move the threshold such that twenty GUI screens that have a speechability score above the threshold since the ten additional GUI screens would also be good candidates to add a VUI thereto. Such updated or re-ranked list and/or the list with the positionally adjusted threshold is then returned to parser 400.

Method 640 may continue with GUI parser 400 emulating the logic utilized by the tester/test electronic device to re-rank the list of GUI screens and/or to positionally adjust the threshold (block 648). For example, GUI parser 400 may identify that the GUI screen the tester moved from below the threshold to above the threshold had a higher than average number of text GUI object therein and may conclude that the importance of text GUI objects within GUI screens should be valued higher.

Method 640 may continue with GUI parser 400 increasing or decreasing as applicable the weight values for GUI objects or the value of the speeachability threshold according to the emulated logic (block 650). For example, after GUI parser 400 identify that the GUI screen the tester moved from below the threshold to above the threshold had a higher than average number of text GUI object therein and concludes that the importance of text GUI objects within GUI screens should be valued higher, the GUI parser 400 increases the weight value for GUI text objects so that future speechability scores are calculated with the updated weighting. In another example, after GUI parser 400 identify that the speechability threshold should be decreased, the GUI parser 400 decreases the threshold speechability value so that more GUI screens are identified as prime candidates for the addition of a VUI associated therewith. Method 640 ends at block 652.

Figures 13, 14:
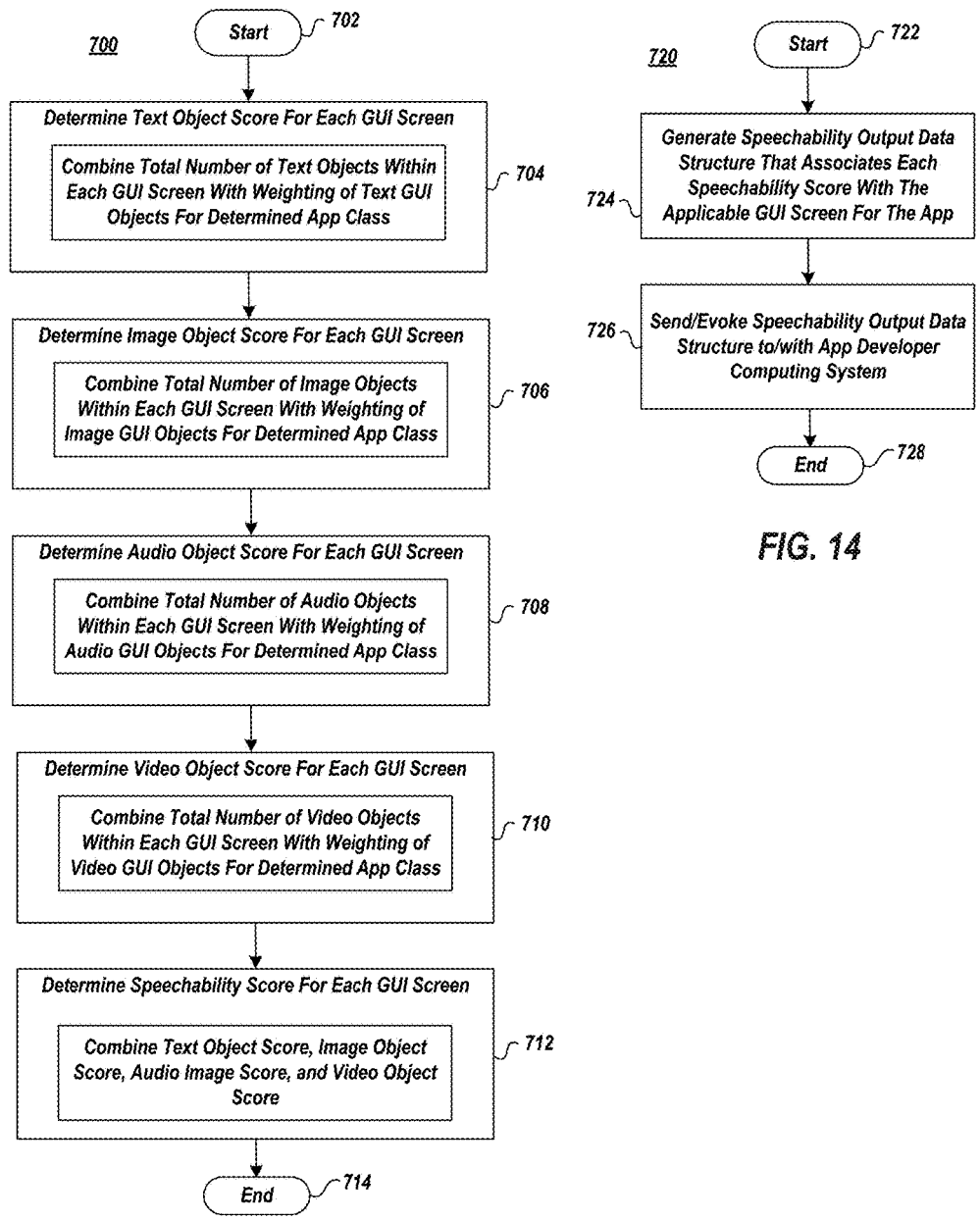
FIG. 13 illustrates a method for the GUI screen parser to determine a speechability score for a GUI screen, according to one or more embodiments.
FIG. 14 illustrates a method for the GUI screen parser to generate a speechability score data structure, according to one or more embodiments.

FIG. 13 illustrates a method 700 for the GUI screen parser 400 to determine a speechability score for a GUI screen. Method 700 may be utilized to generate a speechability score associated witch each aggregated GUI screen of application 102. Method 700 begins at block 702 and continues with GUI screen parser 400 determining a text GUI object speechability score for each GUI screen (block 704). For example, for each aggregated GUI screen, speechability analyzer 450 totals the number of text objects and combines that total with the weight value for text GUI objects obtained from rules store 442 associated with the applicable class of application 102. In a particular embodiment, for each aggregated GUI screen, speechability analyzer 450 totals the number of text objects and multiplies that total with the weight value for text GUI objects obtained from rules store 442 associated with the applicable class of application 102.

Method 700 may continue with GUI screen parser 400 determining an image GUI object speechability score for each GUI screen (block 706). For example, for each aggregated GUI screen, speechability analyzer 450 totals the number of image objects and combines that total with the weight value for image GUI objects obtained from rules store 442 associated with the applicable class of application 102. In a particular embodiment, for each aggregated GUI screen, speechability analyzer 450 totals the number of image objects and multiplies that total with the weight value for image GUI objects obtained from rules store 442 associated with the applicable class of application 102.

Method 700 may continue with GUI screen parser 400 determining an audio GUI object speechability score for each GUI screen (block 708). For example, for each aggregated GUI screen, speechability analyzer 450 totals the number of audio objects and combines that total with the weight value for audio GUI objects obtained from rules store 442 associated with the applicable class of application 102. In a particular embodiment, for each aggregated GUI screen, speechability analyzer 450 totals the number of audio objects and multiplies that total with the weight value for audio GUI objects obtained from rules store 442 associated with the applicable class of application 102.

Method 700 may continue with GUI screen parser 400 determining a video GUI object speechability score for each GUI screen (block 710). For example, for each aggregated GUI screen, speechability analyzer 450 totals the number of video objects and combines that total with the weight value for video GUI objects obtained from rules store 442 associated with the applicable class of application 102. In a particular embodiment, for each aggregated GUI screen, speechability analyzer 450 totals the number of video objects and multiplies that total with the weight value for video GUI objects obtained from rules store 442 associated with the applicable class of application 102.

Method 700 may continue with GUI screen parser 400 determining the speechability score for each GUI screen (block 712). For example, for each GUI screen, speechability analyzer 450 totals the text GUI object speechability score, the image GUI object speechability score, the audio GUI object speechability score, and the video GUI object speechability score to determine the speechability score for each respective GUI screen. Method 700 ends at block 714.

FIG. 14 illustrates a method 720 for the GUI screen parser 400 to generate a speechability score output data structure 480. Method 720 begins at block 722 and continues with parser 400 generating or organizing the speechability score and/or the speechability score components associated with the GUI screen and/or associated with the GUI objects within the GUI screen (block 724). For example, speechability analyzer 450 may generate a data pair consisting of an identifier of the GUI screen and the speechability score for that GUI screen. In another example, speechability analyzer 450 may generate a table consisting of e.g., rows of GUI screens and a first column of speechability scores, a second column of the text speeachability score components, a third column of the image speeachability score components, a fourth column of the audio speeachability score components, and/or a fifth column of the video speeachability score components. The generated data structure 480 may be organized in a list of GUI screens ranked based upon their respective GUI scores. For example, the first GUI screen in the ranked list is associated with the highest speechability score which indicates the first GUI screen is a high candidate to add a VUI thereto. The data structure 480 may also include the speechability threshold such that those GUI screens with a speechability score above the threshold are indicated as good candidates to add a VUI thereto and those GUI screens with a speechability score below the threshold are indicated as poor candidates to add a VUI thereto. In one example, only those GUI screens with a speechability score above the threshold are included in the output data structure 480.

Method 720 may continue with sending/evoking the output data structure 480 with the processor 210 via memory 220 of computing system 200. If parser 400 is local to system 200 the processor 210 via memory 220 may evoke or otherwise read the data structure 480 from memory 220, or from memory 220 via storage 230, if not already local to memory 220. If parser 400 is not local to system 200 the data structure 480 is sent to system 200 by speechability notifier 460. Once the data structure 480 is local to system 200, the processor 210 via memory 220 may evoke or otherwise read the data structure 480 from memory 220 or from memory 220 via storage 230, if not already local to memory 220. Method 720 ends at block 728.

Figure 15:
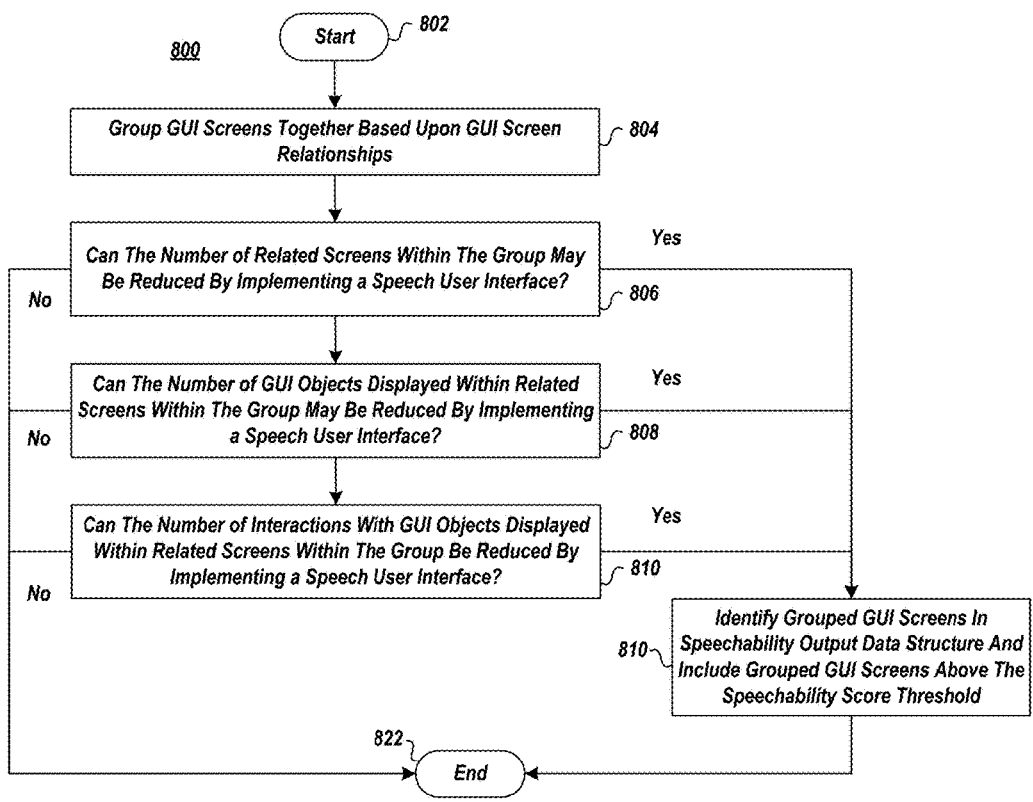
FIG. 15 illustrates a method for the GUI screen parser to determine whether efficiency or user experience of a GUI may be increased, according to one or more embodiments.

FIG. 15 illustrates a method 800 for the GUI screen parser 400 to determine whether efficiency or user experience of a GUI may be increased (e.g., the number of displayed GUI screens to the user may be decreased, the number of GUI objects displayed may be reduced, or the like) by implanting a VUI to a group of related GUI screens. Method 800 may be utilized by SUI screen reduction analyzer 470 to flag or otherwise identify a group of related GUI screens that may be consolidated with the implementation of a VUI. Method 800 begins at bloc 802 and continues with parser 400 grouping related GUI screens together (block 804). For example, GUI screen reduction analyzer 470 determines which application 102 GUI screens are related and determines whether application 102 user experience or user efficiency may be increased with the addition or integration of a VUI to those application 102 GUI screens. The screen reduction analyzer 470 may utilize relationship information obtained by GUI screen relationship analyzer 432. GUI screen relationship analyzer 432 may determine that GUI screens are related if they share the same GUI object. The GUI screen relationship analyzer 432 may further determine that GUI screens are related if they share the same GUI object if there is a pointer or target associated with one GUI screen points or identifies the other GUI screen. The pointer/target may be identified during execution of application 102 and/or during the static code scan of application 102 or specified ordering of GUI screens specified by the GUI storyboard(s) and/or mockup(s).

Method 800 may continue with parser 400 determining whether the number of related GUI screens within the group may be reduced by implementing a VUI (block 806). For example, GUI screen reduction analyzer 470 determines that there are five preexisting application 102 GUI screens that are related and determines and the speechability scores for those five GUI screens may be calculated and are indicative to show that those related GUI screens are candidates for a VUI to be added thereto. It is further determined that if in fact the VUI is added, that the functionality of the VUI will or is like to reduce the number of those related screens that need to be displayed. If it is determined that the number of GUI screens within the group that would be displayed are not reduced, method 800 ends at block 822.

Method 800 may continue with parser 400 determining whether the number of GUI objects displayed within the related GUI screens may be reduced by implementing a VUI (block 808). For example, GUI screen reduction analyzer 470 determines each related GUI screen contains the same text GUI object and that that text GUI object would not need to be displayed if a VUI is implemented within those related GUI screens, determines each related GUI screen contains the same image GUI object and that that the image GUI object would not need to be displayed if a VUI is implemented within those related GUI screens, and the like. If it is determined that the number of GUI objects within the group that would be displayed are not reduced, method 800 ends at block 822.

Method 800 may continue with parser 400 determining whether the number of user interactions or engagements upon GUI objects displayed within the related GUI screens may be reduced by implementing a VUI (block 810). For example, GUI screen reduction analyzer 470 determines whether the number of user engagements (clicks, touch gestures, or the like) upon GUI objects displayed within the related GUI screens may be reduced if a VUI is implemented within those related GUI screens. If it is determined that the number of user interactions upon displayed GUI objects within the group are not reduced, method 800 ends at block 822.

If it is determined that the number of GUI screens within the group that would be displayed are reduced, if it is determined that the number of GUI objects within the group that would be displayed is reduced, or if it is determined that the number of user interactions upon displayed GUI objects within the group are reduced, method 800 continues to block 810 where those related GUI screens are identified or otherwise flagged within the output data structure 480. For example, those screens are included above the threshold. In another implementation, the data structure separately includes those related GUI screens where efficiency would be increased with the addition of VUI versus those GUI screens associated with their respective calculated speechability scores. Method ends at block 822.

Figure 16:
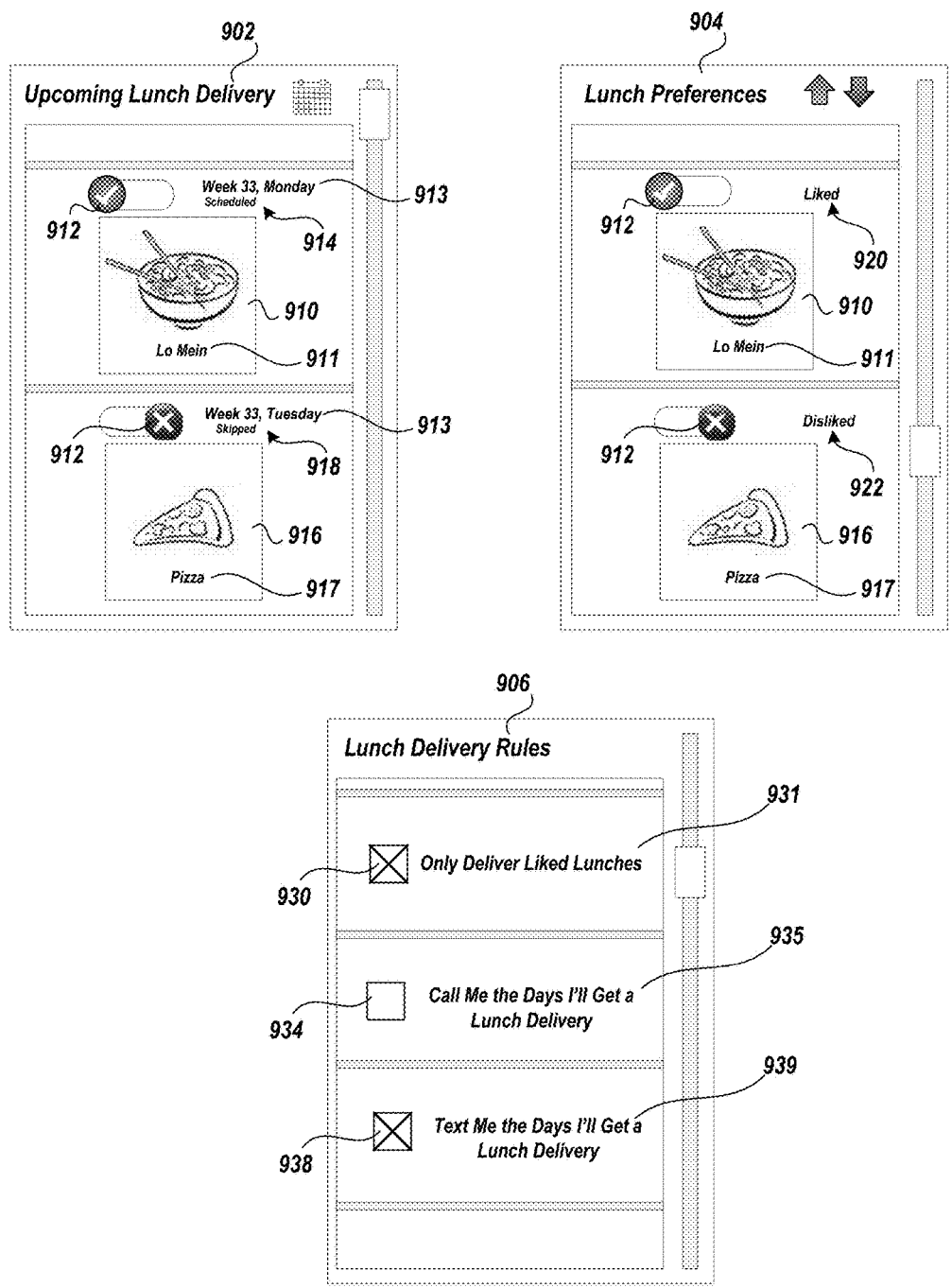
FIG. 16 illustrates exemplary GUI screens, according to one or more embodiments.

FIG. 16 illustrates exemplary GUI screens 900A, 900B, and 900C. The term "GUI screen" or the like is defined herein to be a static image of the graphical user interface that is displayed to a user of the associated application. GUI screen 900A includes a GUI screen identifier text GUI object 902, a image GUI object 910, a text GUI object 911, an image selection GUI object 912, a text GUI object 913, an GUI text object 914, a text GUI object 915, an image GUI object 916, a text GUI object 917, and a text GUI object 918.

Image GUI object 910 is an exemplary output image GUI object that displays an output image to the user of application 102. Text GUI object 902, text GUI object 911 and text GUI object 913 are exemplary output text objects that display output text to the user of application 102. Selection image object 912 is an exemplary input and output GUI object that displays a selection (i.e. input) and result of the selection (i.e. output) image by the user of application 102.

For example, the user may select the image GUI object 912 and a selection image is displayed associated therewith and the user may deselect the image GUI object 912 and a de-selection image is displayed associated therewith. Text output GUI object 914 may then be displayed as a result of the user selecting image GUI object 912.

Image GUI object 916 is an exemplary output image GUI object that displays an output image to the user of application 102. Text GUI object 917 and text GUI object 915 are exemplary output text objects that display output text to the user of application 102. Text output GUI object 918 may be displayed as a result of the user deselecting image GUI object 912. The selection image object 912 may also be displayed by text as text GUI object 914.

GUI screen 900B includes a GUI screen identifier text GUI object 904, image GUI object 910, text GUI object 911, image selection GUI object 912, a text GUI object 920, image GUI object 916, text GUI object 917, and a text GUI object 922. In GUI screen 900B, upon the user selecting image selection GUI object 912, text output GUI object 920 indicates that such selection has been made and indicates appropriate output text upon the GUI screen and upon the user deselecting image selection GUI object 912, text output GUI object 922 indicates that such deselection has been made and indicates appropriate output text upon the GUI screen.

GUI screen 900C includes a GUI screen identifier text GUI object 906, selection image object 930, text GUI object 931, selection image object 934, text GUI object 935, selection image object 938, and text GUI object 939. Selection image object 930 displays a section image upon the selection thereof in order for the user to implement the output text GUI object 931 function, selection image object 930 displays a deselection image upon the deselection thereof in order for the user to not implement the output text GUI object 935 function, and selection image object 938 displays a section image upon the selection thereof in order for the user to implement the output text GUI object 939 function.

According to various embodiments as described herein, parser 400 may analyze each GUI screen 900A, 900B 900C and calculate a speechability score associated therewith to determine whether they are primed for the addition of a VUI thereto and/or determine whether the GUI screens 900A, 900B, and 900C are related and whether the display of the GUI screens, display of GUI objects within those screens, and/or user interactions of those GUI objects may be reduced with the implementation of the VUI. Such designations are made by parser 400 within output data structure 480 which is read by computing system 200 in order to determine whether a VUI should be added to GUI screens 900A, 900B 900C of application 102.

Figure 17:
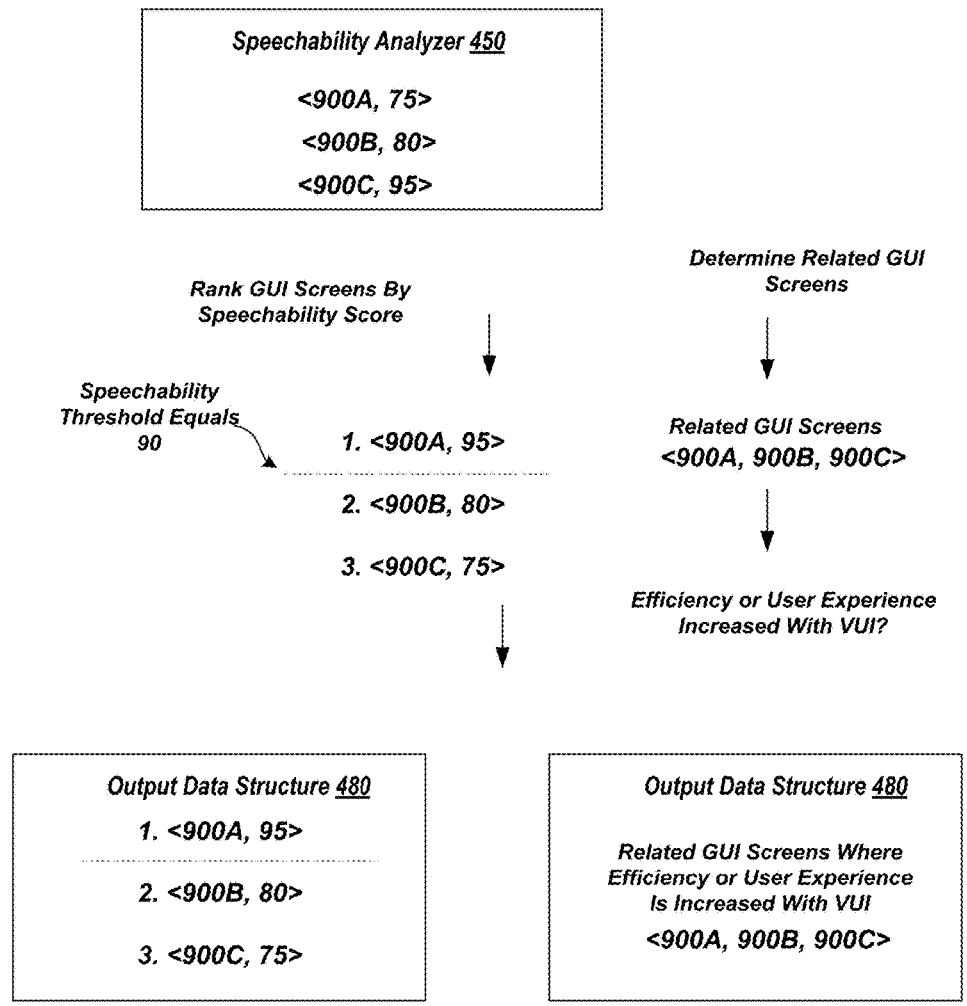
FIG. 17 illustrates the implementation of various embodiments of the present invention upon the exemplary GUI screens of FIG. 16.

FIG. 17 illustrates the implementation of various embodiments of the present invention upon GUI screens 900A, 900B, and 900C. The speechability analyzer 450 calculates the speechability score for each GUI screen 900A, 900B, and 900C. For example the speechability analyzer 450 calculates a speechability score of 75 for GUI screen 900A, calculates a speechability score of 80 for GUI screen 900B, and calculates a speechability score of 95 for GUI screen 900C. Speechability analyzer 450 may generate the output data structure 480 by ranking the GUI screens 900A, 900B, and 900C by the speechability score and including the identifier of the GUI screens 900A, 900B, and 900C along with its calculated speechability score along with the determined speechability threshold. The output data structure 480 includes an indication of which GUI screens have a speechability score above the threshold and which GUI screens have a speechability score below the threshold.

Relationship analyzer 470 determines that GUI screens 900A, 900B, and 900C are related because they share GUI objects and because there is a first pointer or target within GUI screen 900A that points to 900B and a second pointer or target within GUI screen 900B that points to 900C. Relationship analyzer 470 then determines that user experience or application 102 efficiency would be increased with the addition of a VUI and indicates such within the output data structure 480.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments presented herein may be devised without departing from the basic scope thereof, and the scope thereof is determined by the claims that follow.

What is claimed is:

1. A method, comprising:
    receiving application data of an application that is under development with a speechability service computing system from an application developer computing system;
    determining an application class of the application from the application data;
    aggregating static images of a graphical user interface of the application (GUI screens) that are contained within the application data;
    analyzing each GUI screen to determine a quantity of text GUI objects within each GUI screen, a quantity of image GUI objects within each GUI screen, a quantity of audio GUI objects within each GUI screen, and a quantity of video GUI objects within each GUI screen;
    assigning a speechability score to each GUI screen based upon the quantity of text GUI objects within each GUI screen, the quantity of image GUI objects within each GUI screen, the quantity of audio GUI objects within each GUI screen, and the quantity of video GUI objects within each GUI screen;

generating a list of GUI screens ranked by the speechability score of each GUI screen;

identifying a speechability threshold that is associated with the application class;

creating an output data structure comprising the ranked list of GUI screens and a positive indication of first GUI screens that have a speechability score above the speechability threshold to designate the first GUI screens benefit from a voice user interface (VUI); and sending the output data structure with the application developer computing system.

2. The method of claim 1, wherein the output data structure further includes an indication of second GUI screens that have a speechability score below the speechability threshold to designate the second GUI screens do not benefit from a VUI.

3. The method of claim 1, wherein the GUI screens are aggregated screenshots of the application under development that is evoked by the application developer computing system.

4. The method of claim 1, wherein the GUI screens are aggregated from an executable file of the application under development.

5. The method of claim 1, wherein the GUI screens are aggregated from mockup images of the application under development.

6. The method of claim 1, wherein the GUI screens are aggregated from storyboard images of the application under development.

7. The method of claim 1, further comprising:
determining the GUI screens that share a same GUI object.

8. The method of claim 1, wherein assigning the speechability score comprises:
determining a text GUI object weight value associated with the application class, determining an image GUI object weight value associated with the application class, determining an audio GUI object weight value associated with the application class, and determining a video GUI object weight value associated with the application class.

9. The method of claim 8, wherein assigning the speechability score further comprises:
combining the quantity of text GUI objects within each GUI screen with the text GUI object weight value, combining the quantity of image GUI objects within each GUI screen with the image GUI object weight value, combining the quantity of audio GUI objects within each GUI screen with the audio GUI object weight value, and combining the quantity of video GUI objects within each GUI screen with the video GUI object weight value.

10. A computer program product comprising a computer readable storage medium having program instructions embodied therewith, the program instructions readable by a speechability service computing system to cause the speechability service computing system to:
receive application data of an application that is under development from an application developer computing system;
determine an application class of the application from the application data;
aggregate static images of a graphical user interface of the application (GUI screens) that are contained within the application data;
analyze each GUI screen to determine a quantity of text GUI objects within each GUI screen, a quantity of image GUI objects within each GUI screen, a quantity of audio GUI objects within each GUI screen, and a quantity of video GUI objects within each GUI screen;
assign a speechability score to each GUI screen based upon the quantity of text GUI objects within each GUI screen, the quantity of image GUI objects within each GUI screen, the quantity of audio GUI objects within each GUI screen, and the quantity of video GUI objects within each GUI screen;
generate a list of GUI screens ranked by the speechability score of each GUI screen;
identify a speechability threshold that is associated with the application class;
create an output data structure comprising the ranked list of GUI screens and a positive indication of first GUI screens that have a speechability score above the speechability threshold to designate the first GUI screens benefit from a voice user interface (VUI); and
send the output data structure with the application developer computing system.

11. The computer program product of claim 10, wherein the output data structure further includes an indication of second GUI screens that have a speechability score below the speechability threshold to designate the second GUI screens do not benefit from a VUI.

12. The computer program product of claim 10, wherein the GUI screens are aggregated screenshots of the application under development that is evoked by the application developer computing system.

13. The computer program product of claim 10, wherein the GUI screens are aggregated from an executable file of the application under development.

14. The computer program product of claim 10, wherein the GUI screens are aggregated from mockup images of the application under development.

15. The computer program product of claim 10, wherein the GUI screens are aggregated from storyboard images of the application under development.

16. The computer program product of claim 10, wherein the program instructions further cause the speechability service computing system to:
determine the GUI screens that share a same GUI object.

17. The computer program product of claim 10, wherein the program instructions that cause the speechability service computing system to assign the speechability score, further cause the speechability service computing system to:
determine a text GUI object weight value associated with the application class, determine an image GUI object weight value associated with the application class, determine an audio GUI object weight value associated with the application class, and determine a video GUI object weight value associated with the application class.

18. The computer program product of claim 17, wherein the program instructions that cause the speechability service computing system to assign the speechability score, further cause the speechability service computing system to:
combine the quantity of text GUI objects within each GUI screen with the text GUI object weight value, combine the quantity of image GUI objects within each GUI screen with the image GUI object weight value, combine the quantity of audio GUI objects within each GUI screen with the audio GUI object weight value, and combine the quantity of video GUI objects within each GUI screen with the video GUI object weight value.

19. An speechability service computing system comprising:
- a processor and a memory communicatively coupled to the processor, wherein the memory is encoded with instructions that, when executed by the processor, cause the processor to:
- receive application data of an application that is under development from an application developer computing system;
  - determine an application class of the application from the application data;
- aggregate static images of a graphical user interface of the application (GUI screens) that are contained within the application data;
  - analyze each GUI screen to determine a quantity of text GUI objects within each GUI screen, a quantity of image GUI objects within each GUI screen, a quantity of audio GUI objects within each GUI screen, and a quantity of video GUI objects within each GUI screen;
  - assign a speechability score to each GUI screen based upon the quantity of text GUI objects within each GUI screen, the quantity of image GUI objects within each GUI screen, the quantity of audio GUI objects within each GUI screen, and the quantity of video GUI objects within each GUI screen;
  - generate a list of GUI screens ranked by the speechability score of each GUI screen;
  - identify a speechability threshold that is associated with the application class;
  - create an output data structure comprising the ranked list of GUI screens and a positive indication of first GUI screens that have a speechability score above the speechability threshold to designate the first GUI screens benefit from a voice user interface (VUI); and
  - send the output data structure with the application developer computing system.

20. The speechability service computing system of claim 19, wherein the output data structure further includes an indication of second GUI screens that have a speechability score below the speechability threshold to designate the second GUI screens do not benefit from a VUI.

* * * * *